US011997687B2

United States Patent
Sood et al.

(10) Patent No.: US 11,997,687 B2
(45) Date of Patent: May 28, 2024

(54) ADVANCED ADAPTIVE RECEIVERS BASED ON SPECTRAL EFFICIENCY UTILIZATION

(71) Applicant: QUALCOMM Incorporated, San Diego, CA (US)

(72) Inventors: Ritesh Sood, San Jose, CA (US); Sibasish Das, San Diego, CA (US); Weixian Shen, San Diego, CA (US); Udayan Bhawnani, San Diego, CA (US); Manav Lnu, Hyderabad (IN); Vivek Kumar Rangamgari, Secunderabad (IN)

(73) Assignee: QUALCOMM Incorporated, San Diego, CA (US)

( * ) Notice: Subject to any disclaimer, the term of this patent is extended or adjusted under 35 U.S.C. 154(b) by 239 days.

(21) Appl. No.: 17/239,391

(22) Filed: Apr. 23, 2021

(65) Prior Publication Data

US 2022/0361225 A1 Nov. 10, 2022

(51) Int. Cl.
*H04W 72/23* (2023.01)
*H04W 72/0446* (2023.01)
*H04W 72/21* (2023.01)

(52) U.S. Cl.
CPC ....... *H04W 72/23* (2023.01); *H04W 72/0446* (2013.01); *H04W 72/21* (2023.01)

(58) Field of Classification Search
CPC .. H04W 72/23; H04W 72/21; H04W 72/0446
See application file for complete search history.

(56) References Cited

U.S. PATENT DOCUMENTS

| 11,516,863 | B1* | 11/2022 | Marupaduga | ......... H04W 76/15 |
| 2011/0045860 | A1* | 2/2011 | Nam | ....................... H04L 5/0023 |
| | | | | 455/507 |
| 2011/0149780 | A1* | 6/2011 | Bollea | .................. H04B 7/0617 |
| | | | | 370/252 |
| 2011/0249629 | A1* | 10/2011 | Ko | .......................... H04B 7/063 |
| | | | | 370/329 |
| 2012/0106501 | A1* | 5/2012 | Kishiyama | ............ H04L 5/0048 |
| | | | | 370/329 |

(Continued)

FOREIGN PATENT DOCUMENTS

| WO | WO-2013130889 A2 | 9/2013 |
| WO | WO-2014059665 A1 | 4/2014 |

OTHER PUBLICATIONS

International Search Report and Written Opinion—PCT/US2022/030238—ISA/EPO—dated Oct. 14, 2022.

*Primary Examiner* — Jasper Kwoh
(74) *Attorney, Agent, or Firm* — Holland & Hart LLP

(57) ABSTRACT

Methods, systems, and devices for wireless communications are described. A user equipment (UE) may receive one or more downlink grants while operating in accordance with a first receive state during a threshold number of transmission time intervals (TTIs). The UE may determine a weighting factor for each TTI within the threshold number of TTIs, where the determined weighting factors are based on a spectral efficiency (SPEF) of channel communications between the UE and a base station. The UE may sum a subset of the weighting factors to determine a transition determination value, and may transition from the first receive state to a second receive state based on evaluation of the transition determination value.

26 Claims, 13 Drawing Sheets

(56) References Cited

U.S. PATENT DOCUMENTS

| | | | |
|---|---|---|---|
| 2012/0142295 A1* | 6/2012 | Tseng | H04B 7/082 |
| | | | 455/226.2 |
| 2014/0050130 A1* | 2/2014 | Kim | H04L 5/0053 |
| | | | 370/280 |
| 2014/0161050 A1* | 6/2014 | Grinshpun | H04L 65/764 |
| | | | 370/328 |
| 2017/0359200 A1 | 12/2017 | Almalfouh et al. | |
| 2019/0356426 A1* | 11/2019 | He | H04L 1/1822 |
| 2020/0267760 A1 | 8/2020 | Bhattad et al. | |

* cited by examiner

ADVANCED ADAPTIVE RECEIVERS BASED ON SPECTRAL EFFICIENCY UTILIZATION

FIELD OF TECHNOLOGY

The following relates to wireless communications, including advanced adaptive receivers based on spectral efficiency utilization.

BACKGROUND

Wireless communications systems are widely deployed to provide various types of communication content such as voice, video, packet data, messaging, broadcast, and so on. These systems may be capable of supporting communication with multiple users by sharing the available system resources (e.g., time, frequency, and power). Examples of such multiple-access systems include fourth generation (4G) systems such as Long Term Evolution (LTE) systems, LTE-Advanced (LTE-A) systems, or LTE-A Pro systems, and fifth generation (5G) systems which may be referred to as New Radio (NR) systems. These systems may employ technologies such as code division multiple access (CDMA), time division multiple access (TDMA), frequency division multiple access (FDMA), orthogonal FDMA (OFDMA), or discrete Fourier transform spread orthogonal frequency division multiplexing (DFT-S-OFDM). A wireless multiple-access communications system may include one or more base stations or one or more network access nodes, each simultaneously supporting communication for multiple communication devices, which may be otherwise known as user equipment (UE).

A UE may receive downlink communications including downlink grants from a base station using a number of receive antennas. Techniques for receiving and evaluating downlink grants at the UE are desired.

SUMMARY

The described techniques relate to improved methods, systems, devices, and apparatuses that support advanced adaptive receivers based on spectral efficiency (SPEF) utilization. Generally, the described techniques provide for improved measurement and evaluation of downlink traffic conditions. A wireless device such as a user equipment (UE) may use a traffic state machine (STM) to evaluate traffic statistics for receiving downlink information in a wireless communications system. For example, the UE may transition between different receive states using different numbers of active receive antennas based on a number downlink grants that the UE receives in a time interval.

The UE may implement a number of techniques that may allow for adaptive measurement of traffic conditions based on weighted calculations involving the spectral efficiency SPEF for received downlink grants. For example, the UE may calculate one or more weighting factors (II) for a set of transmission time intervals (TTIs) that the UE evaluates based on a ratio between a granted SPEF (e.g., the number of information bits per resource element that is scheduled for the UE) and reported a SPEF (e.g., an estimate of information bits per resource element that it can decode reliably). The UE may apply the weighting factor to a burst detection function which is used or a scheduling rate function to determine a transition determination value for transitioning to different receive states. Based on the value of the transition determination value exceeding a threshold value, the UE may transition to a different receive state.

A method for wireless communications at a UE is described. The method may include receiving, from a base station and within a threshold number of TTIs, one or more downlink grants while operating in accordance with a first receive state of a set of multiple receive states at the UE, determining a weighting factor for each TTI within the threshold number of TTIs, the weighting factors each based on a SPEF of channel communications between the base station and the UE, summing at least a subset of the weighting factors in order to identify a transition determination value, and transitioning from the first receive state to a second receive state of the set of multiple receive states based on the transition determination value.

An apparatus for wireless communications at a UE is described. The apparatus may include a processor, memory coupled with the processor, and instructions stored in the memory. The instructions may be executable by the processor to cause the apparatus to receive, from a base station and within a threshold number of TTIs, one or more downlink grants while operating in accordance with a first receive state of a set of multiple receive states at the UE, determine a weighting factor for each TTI within the threshold number of TTIs, the weighting factors each based on a SPEF of channel communications between the base station and the UE, sum at least a subset of the weighting factors in order to identify a transition determination value, and transition from the first receive state to a second receive state of the set of multiple receive states based on the transition determination value.

Another apparatus for wireless communications at a UE is described. The apparatus may include means for receiving, from a base station and within a threshold number of TTIs, one or more downlink grants while operating in accordance with a first receive state of a set of multiple receive states at the UE, means for determining a weighting factor for each TTI within the threshold number of TTIs, the weighting factors each based on a SPEF of channel communications between the base station and the UE, means for summing at least a subset of the weighting factors in order to identify a transition determination value, and means for transitioning from the first receive state to a second receive state of the set of multiple receive states based on the transition determination value.

A non-transitory computer-readable medium storing code for wireless communications at a UE is described. The code may include instructions executable by a processor to receive, from a base station and within a threshold number of TTIs, one or more downlink grants while operating in accordance with a first receive state of a set of multiple receive states at the UE, determine a weighting factor for each TTI within the threshold number of TTIs, the weighting factors each based on a SPEF of channel communications between the base station and the UE, sum at least a subset of the weighting factors in order to identify a transition determination value, and transition from the first receive state to a second receive state of the set of multiple receive states based on the transition determination value.

Some examples of the method, apparatuses, and non-transitory computer-readable medium described herein may further include operations, features, means, or instructions for determining the SPEF of channel communications between the base station and the UE for each TTI based on a ratio between a first SPEF associated with scheduled information bits per resource element scheduled by the base station and a second SPEF associated with a number of information bits per resource element the UE may be capable of decoding.

Some examples of the method, apparatuses, and non-transitory computer-readable medium described herein may further include operations, features, means, or instructions for determining the first SPEF by summing one or more SPEF values for one or more respective code words of a downlink grant, each of the one or more SPEF values being a product of a number of layers associated with the downlink grant, a code rate, and a modulation order for individual ones of the one or more respective code words.

Some examples of the method, apparatuses, and non-transitory computer-readable medium described herein may further include operations, features, means, or instructions for determining the second SPEF by estimating, at the UE, a capability to decode the number of information bits per resource element.

Some examples of the method, apparatuses, and non-transitory computer-readable medium described herein may further include operations, features, means, or instructions for transmitting, to the base station, a channel state information report based on a mapping between the second SPEF and a rank indication, a channel quality index, or both.

In some examples of the method, apparatuses, and non-transitory computer-readable medium described herein, summing at least the subset of the weighting factors in order to identify the transition determination value may include operations, features, means, or instructions for summing individual weighting factors that correspond to individual TTIs of the threshold number of TTIs that may have at least one of the one or more downlink grants.

In some examples of the method, apparatuses, and non-transitory computer-readable medium described herein, the transition determination value includes a burst detection transition determination value based on the summing of at least the subset of the weighting factors in accordance with a burst detection function and the method, apparatuses, and non-transitory computer-readable medium may include further operations, features, means, or instructions for determining whether to transition from the first receive state to the second receive state based on the burst detection transition determination value, where the first receive state includes a receive disallowed state and the second receive state includes a receive standby state.

Some examples of the method, apparatuses, and non-transitory computer-readable medium described herein may further include operations, features, means, or instructions for comparing the burst detection transition determination value to a threshold burst detection transition determination value and determining whether to transition from the first receive state to the second receive state based on the comparing.

Some examples of the method, apparatuses, and non-transitory computer-readable medium described herein may further include operations, features, means, or instructions for determining to transition from the first receive state to the second receive state based on the burst detection transition determination value exceeding the threshold burst detection transition determination value.

In some examples of the method, apparatuses, and non-transitory computer-readable medium described herein, the threshold burst detection transition determination value may be configured based on long-term downlink traffic statistics, short-term downlink traffic statistics, or both.

In some examples of the method, apparatuses, and non-transitory computer-readable medium described herein, the transition determination value includes a scheduling rate transition determination value based on the summing of at least the subset of the weighting factors in accordance with a scheduling rate function and the method, apparatuses, and non-transitory computer-readable medium may include further operations, features, means, or instructions for determining whether to transition from the first receive state to the second receive state based on the scheduling rate transition determination value, where the first receive state includes a receive standby and the second receive state includes a receive disallowed state.

Some examples of the method, apparatuses, and non-transitory computer-readable medium described herein may further include operations, features, means, or instructions for comparing the transition determination value to a threshold scheduling rate transition determination value and determining whether to transition from the first receive state to the second receive state based on the comparing.

Some examples of the method, apparatuses, and non-transitory computer-readable medium described herein may further include operations, features, means, or instructions for determining to transition from the first receive state to the second receive state based on the scheduling rate transition determination value exceeding the threshold scheduling rate transition determination value.

In some examples of the method, apparatuses, and non-transitory computer-readable medium described herein, the threshold scheduling rate transition determination value may be configured based on long-term downlink traffic statistics, short-term downlink traffic statistics, or both.

In some examples of the method, apparatuses, and non-transitory computer-readable medium described herein, the first receive state may be associated with a first number of receive antennas and the second receive state may be associated with a second number of receive antennas different than the first number of receive antennas.

In some examples of the method, apparatuses, and non-transitory computer-readable medium described herein, the weighting factor may be a function of a subframe index of the one or more downlink grants.

In some examples of the method, apparatuses, and non-transitory computer-readable medium described herein, the one or more downlink grants include one-layer grants, two-layer grants, or a combination thereof.

DETAILED DESCRIPTION

In some wireless communications systems, a UE may use a traffic state machine (STM) to evaluate long-term and short-term traffic statistics for receiving downlink information from a network entity such as a base station. Accordingly, the UE may transition between different receive states using different numbers of active receive antennas (e.g., different adaptive receive diversities (ARD)) based on the observed downlink traffic in the system. For example, if a UE is in a first state such as an adaptive receive (ARx) standby state, the UE may use from 1 receive (Rx) antenna up to 4 Rx antennas based on the number of downlink grants the UE receives during a time interval. If the number of grants that the UE receives over the time interval falls below a threshold, however, the UE may transition to a second state such as an ARx disallowed state, where the UE may use 1 Rx antenna up to 2 Rx antennas based on downlink traffic. When the number of grants received by the UE exceeds the threshold, the UE may transition back to the ARx standby state.

Procedures in which the UE bases the determination of whether to transition between states solely on grant count during the time interval, however, fails to account for the payload of the grants, coding rate, and other factors that may affect potential power savings and overall performance of the UE. Thus, in some cases, the UE may implement a number of techniques that may allow for more adaptive measurement of traffic conditions based on a weighted calculation of spectral efficiency (SPEF) for received downlink grants.

For example, the UE may calculate a weighting factor (denoted η) based on a ratio between granted SPEF (e.g., the number of information bits per resource element that is scheduled for the UE) and reported SPEF (e.g., the UE's estimate of information bits per resource element that it can decode reliably). The UE may apply η to a burst detection function which is used to count the number of grants received by the UE operating in an ARx disallowed state. If the number of weighted grants determined by the weighted burst detection function exceeds a threshold, then the UE may transition to an ARx standby state. In addition, the UE may apply η to a scheduling rate function while operating in the ARx standby state to determine the weighted scheduling rate for received downlink grants. If the weighted scheduling rate for the downlink grants falls below a threshold, then the UE may transition to the ARx disallowed state.

Aspects of the disclosure are initially described in the context of wireless communications systems. Aspects of the disclosure are further described in the context of a n STM configuration and a process flow. Aspects of the disclosure are further illustrated by and described with reference to apparatus diagrams, system diagrams, and flowcharts that relate to advanced adaptive receivers based on SPEF utilization.

Figure 1:
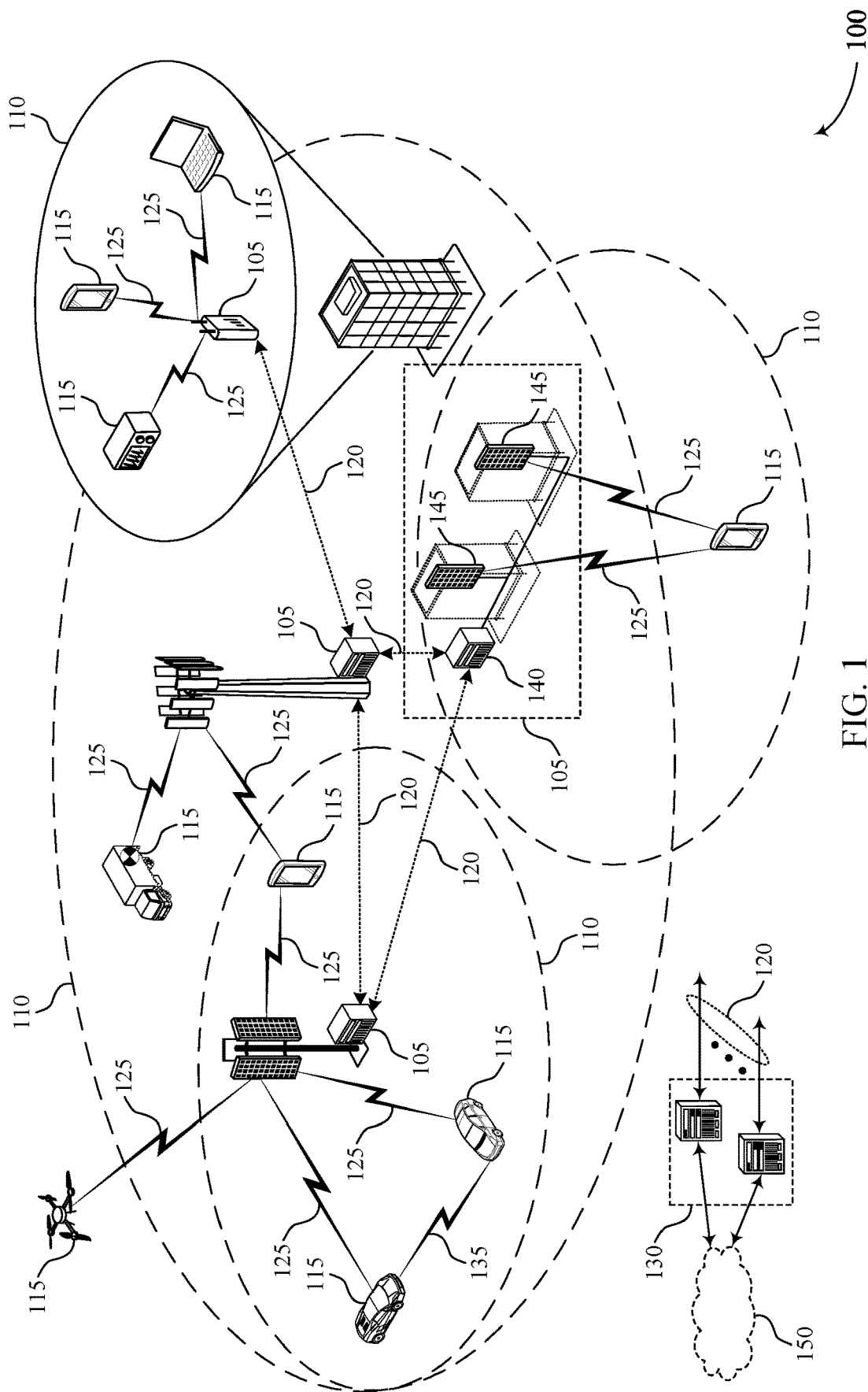
FIG. 1 illustrates an example of a wireless communications system that supports advanced adaptive receivers based on spectral efficiency (SPEF) utilization in accordance with aspects of the present disclosure.

FIG. 1 illustrates an example of a wireless communications system 100 that supports advanced adaptive receivers based on SPEF utilization in accordance with aspects of the present disclosure. The wireless communications system 100 may include one or more base stations 105, one or more UEs 115, and a core network 130. In some examples, the wireless communications system 100 may be a Long Term Evolution (LTE) network, an LTE-Advanced (LTE-A) network, an LTE-A Pro network, or a New Radio (NR) network. In some examples, the wireless communications system 100 may support enhanced broadband communications, ultra-reliable (e.g., mission critical) communications, low latency communications, communications with low-cost and low-complexity devices, or any combination thereof.

The base stations 105 may be dispersed throughout a geographic area to form the wireless communications system 100 and may be devices in different forms or having different capabilities. The base stations 105 and the UEs 115 may wirelessly communicate via one or more communication links 125. Each base station 105 may provide a coverage area 110 over which the UEs 115 and the base station 105 may establish one or more communication links 125. The coverage area 110 may be an example of a geographic area over which a base station 105 and a UE 115 may support the communication of signals according to one or more radio access technologies.

The UEs 115 may be dispersed throughout a coverage area 110 of the wireless communications system 100, and each UE 115 may be stationary, or mobile, or both at different times. The UEs 115 may be devices in different forms or having different capabilities. Some example UEs 115 are illustrated in FIG. 1. The UEs 115 described herein may be able to communicate with various types of devices, such as other UEs 115, the base stations 105, or network equipment (e.g., core network nodes, relay devices, integrated access and backhaul (IAB) nodes, or other network equipment), as shown in FIG. 1.

The base stations 105 may communicate with the core network 130, or with one another, or both. For example, the base stations 105 may interface with the core network 130 through one or more backhaul links 120 (e.g., via an S1, N2, N3, or other interface). The base stations 105 may communicate with one another over the backhaul links 120 (e.g., via an X2, Xn, or other interface) either directly (e.g., directly between base stations 105), or indirectly (e.g., via core network 130), or both. In some examples, the backhaul links 120 may be or include one or more wireless links.

One or more of the base stations 105 described herein may include or may be referred to by a person having ordinary skill in the art as a base transceiver station, a radio base station, an access point, a radio transceiver, a NodeB, an eNodeB (eNB), a next-generation NodeB or a giga-NodeB (either of which may be referred to as a gNB), a Home NodeB, a Home eNodeB, or other suitable terminology.

A UE 115 may include or may be referred to as a mobile device, a wireless device, a remote device, a handheld device, or a subscriber device, or some other suitable terminology, where the "device" may also be referred to as a unit, a station, a terminal, or a client, among other examples. A UE 115 may also include or may be referred to as a personal electronic device such as a cellular phone, a personal digital assistant (PDA), a tablet computer, a laptop computer, or a personal computer. In some examples, a UE 115 may include or be referred to as a wireless local loop (WLL) station, an Internet of Things (IoT) device, an Internet of Everything (IoE) device, or a machine type communications (MTC) device, among other examples, which may be implemented in various objects such as appliances, or vehicles, meters, among other examples.

The UEs 115 described herein may be able to communicate with various types of devices, such as other UEs 115 that may sometimes act as relays as well as the base stations 105 and the network equipment including macro eNBs or gNBs, small cell eNBs or gNBs, or relay base stations, among other examples, as shown in FIG. 1.

The UEs 115 and the base stations 105 may wirelessly communicate with one another via one or more communication links 125 over one or more carriers. The term "carrier" may refer to a set of radio frequency spectrum resources having a defined physical layer structure for supporting the communication links 125. For example, a carrier used for a communication link 125 may include a portion of a radio frequency spectrum band (e.g., a bandwidth part (BWP)) that is operated according to one or more physical layer channels for a given radio access technology (e.g., LTE, LTE-A, LTE-A Pro, NR). Each physical layer channel may carry acquisition signaling (e.g., synchronization signals, system information), control signaling that coordinates operation for the carrier, user data, or other signaling. The wireless communications system 100 may support communication with a UE 115 using carrier aggregation or multi-carrier operation. A UE 115 may be configured with multiple downlink component carriers and one or more uplink component carriers according to a carrier aggregation configuration. Carrier aggregation may be used with both frequency division duplexing (FDD) and time division duplexing (TDD) component carriers.

In some examples (e.g., in a carrier aggregation configuration), a carrier may also have acquisition signaling or control signaling that coordinates operations for other carriers. A carrier may be associated with a frequency channel (e.g., an evolved universal mobile telecommunication system terrestrial radio access (E-UTRA) absolute radio frequency channel number (EARFCN)) and may be positioned according to a channel raster for discovery by the UEs 115. A carrier may be operated in a standalone mode where initial acquisition and connection may be conducted by the UEs 115 via the carrier, or the carrier may be operated in a non-standalone mode where a connection is anchored using a different carrier (e.g., of the same or a different radio access technology).

The communication links 125 shown in the wireless communications system 100 may include uplink transmissions from a UE 115 to a base station 105, or downlink transmissions from a base station 105 to a UE 115. Carriers may carry downlink or uplink communications (e.g., in an FDD mode) or may be configured to carry downlink and uplink communications (e.g., in a TDD mode).

A carrier may be associated with a particular bandwidth of the radio frequency spectrum, and in some examples the carrier bandwidth may be referred to as a "system bandwidth" of the carrier or the wireless communications system 100. For example, the carrier bandwidth may be one of a number of determined bandwidths for carriers of a particular radio access technology (e.g., 1.4, 3, 5, 10, 15, 20, 40, or 80 megahertz (MHz)). Devices of the wireless communications system 100 (e.g., the base stations 105, the UEs 115, or both) may have hardware configurations that support communications over a particular carrier bandwidth or may be configurable to support communications over one of a set of carrier bandwidths. In some examples, the wireless communications system 100 may include base stations 105 or UEs 115 that support simultaneous communications via carriers associated with multiple carrier bandwidths. In some examples, each served UE 115 may be configured for operating over portions (e.g., a sub-band, a BWP) or all of a carrier bandwidth.

Signal waveforms transmitted over a carrier may be made up of multiple subcarriers (e.g., using multi-carrier modulation (MCM) techniques such as orthogonal frequency division multiplexing (OFDM) or discrete Fourier transform spread OFDM (DFT-S-OFDM)). In a system employing MCM techniques, a resource element may consist of one symbol period (e.g., a duration of one modulation symbol) and one subcarrier, where the symbol period and subcarrier spacing are inversely related. The number of bits carried by each resource element may depend on the modulation scheme (e.g., the order of the modulation scheme, the coding rate of the modulation scheme, or both). Thus, the more resource elements that a UE 115 receives and the higher the order of the modulation scheme, the higher the data rate may be for the UE 115. A wireless communications resource may refer to a combination of a radio frequency spectrum resource, a time resource, and a spatial resource (e.g., spatial layers or beams), and the use of multiple spatial layers may further increase the data rate or data integrity for communications with a UE 115.

One or more numerologies for a carrier may be supported, where a numerology may include a subcarrier spacing ($\Delta f$) and a cyclic prefix. A carrier may be divided into one or more BWPs having the same or different numerologies. In some examples, a UE 115 may be configured with multiple BWPs. In some examples, a single BWP for a carrier may be active at a given time and communications for the UE 115 may be restricted to one or more active BWPs.

The time intervals for the base stations 105 or the UEs 115 may be expressed in multiples of a basic time unit which may, for example, refer to a sampling period of $T_s=1/(\Delta f_{max} \cdot N_f)$ seconds, where $\Delta f_{max}$ may represent the maximum supported subcarrier spacing, and $N_f$ may represent the maximum supported discrete Fourier transform (DFT) size. Time intervals of a communications resource may be organized according to radio frames each having a specified duration (e.g., 10 milliseconds (ms)). Each radio frame may be identified by a system frame number (SFN) (e.g., ranging from 0 to 1023).

Each frame may include multiple consecutively numbered subframes or slots, and each subframe or slot may have the same duration. In some examples, a frame may be divided (e.g., in the time domain) into subframes, and each subframe may be further divided into a number of slots. Alternatively, each frame may include a variable number of slots, and the number of slots may depend on subcarrier spacing. Each slot may include a number of symbol periods (e.g., depending on the length of the cyclic prefix prepended to each symbol period). In some wireless communications systems 100, a slot may further be divided into multiple mini-slots containing one or more symbols. Excluding the cyclic prefix, each symbol period may contain one or more (e.g., $N_f$) sampling periods. The duration of a symbol period may depend on the subcarrier spacing or frequency band of operation.

A subframe, a slot, a mini-slot, or a symbol may be the smallest scheduling unit (e.g., in the time domain) of the wireless communications system 100 and may be referred to as a TTI. In some examples, the TTI duration (e.g., the number of symbol periods in a TTI) may be variable. Additionally or alternatively, the smallest scheduling unit of the wireless communications system 100 may be dynamically selected (e.g., in bursts of shortened TTIs (sTTIs)).

Physical channels may be multiplexed on a carrier according to various techniques. A physical control channel and a physical data channel may be multiplexed on a downlink carrier, for example, using one or more of time division multiplexing (TDM) techniques, frequency division multiplexing (FDM) techniques, or hybrid TDM-FDM techniques. A control region (e.g., a control resource set (CORESET)) for a physical control channel may be defined by a number of symbol periods and may extend across the system bandwidth or a subset of the system bandwidth of the carrier. One or more control regions (e.g., CORESETs) may be configured for a set of the UEs 115. For example, one or more of the UEs 115 may monitor or search control regions for control information according to one or more search space sets, and each search space set may include one or multiple control channel candidates in one or more aggregation levels arranged in a cascaded manner. An aggregation level for a control channel candidate may refer to a number of control channel resources (e.g., control channel elements (CCEs)) associated with encoded information for a control information format having a given payload size. Search space sets may include common search space sets configured for sending control information to multiple UEs 115 and UE-specific search space sets for sending control information to a specific UE 115.

Each base station 105 may provide communication coverage via one or more cells, for example a macro cell, a small cell, a hot spot, or other types of cells, or any combination thereof. The term "cell" may refer to a logical communication entity used for communication with a base station 105 (e.g., over a carrier) and may be associated with an identifier for distinguishing neighboring cells (e.g., a physical cell identifier (PCID), a virtual cell identifier (VCID), or others). In some examples, a cell may also refer to a geographic coverage area 110 or a portion of a geographic coverage area 110 (e.g., a sector) over which the logical communication entity operates. Such cells may range from smaller areas (e.g., a structure, a subset of structure) to larger areas depending on various factors such as the capabilities of the base station 105. For example, a cell may be or include a building, a subset of a building, or exterior spaces between or overlapping with geographic coverage areas 110, among other examples.

A macro cell generally covers a relatively large geographic area (e.g., several kilometers in radius) and may allow unrestricted access by the UEs 115 with service subscriptions with the network provider supporting the macro cell. A small cell may be associated with a lower-powered base station 105, as compared with a macro cell, and a small cell may operate in the same or different (e.g., licensed, unlicensed) frequency bands as macro cells. Small cells may provide unrestricted access to the UEs 115 with service subscriptions with the network provider or may provide restricted access to the UEs 115 having an association with the small cell (e.g., the UEs 115 in a closed subscriber group (CSG), the UEs 115 associated with users in a home or office). A base station 105 may support one or multiple cells and may also support communications over the one or more cells using one or multiple component carriers.

In some examples, a carrier may support multiple cells, and different cells may be configured according to different protocol types (e.g., MTC, narrowband IoT (NB-IoT), enhanced mobile broadband (eMBB)) that may provide access for different types of devices.

In some examples, a base station 105 may be movable and therefore provide communication coverage for a moving geographic coverage area 110. In some examples, different geographic coverage areas 110 associated with different technologies may overlap, but the different geographic coverage areas 110 may be supported by the same base station 105. In other examples, the overlapping geographic coverage areas 110 associated with different technologies may be supported by different base stations 105. The wireless communications system 100 may include, for example, a heterogeneous network in which different types of the base stations 105 provide coverage for various geographic coverage areas 110 using the same or different radio access technologies.

The wireless communications system 100 may support synchronous or asynchronous operation. For synchronous operation, the base stations 105 may have similar frame timings, and transmissions from different base stations 105 may be approximately aligned in time. For asynchronous operation, the base stations 105 may have different frame timings, and transmissions from different base stations 105 may, in some examples, not be aligned in time. The techniques described herein may be used for either synchronous or asynchronous operations.

Some UEs 115, such as MTC or IoT devices, may be low cost or low complexity devices and may provide for automated communication between machines (e.g., via Machine-to-Machine (M2M) communication). M2M communication or MTC may refer to data communication technologies that allow devices to communicate with one another or a base station 105 without human intervention. In some examples, M2M communication or MTC may include communications from devices that integrate sensors or meters to measure or capture information and relay such information to a central server or application program that makes use of the information or presents the information to humans interacting with the application program. Some UEs 115 may be designed to collect information or enable automated behavior of machines or other devices. Examples of applications for MTC devices include smart metering, inventory monitoring, water level monitoring, equipment monitoring, healthcare monitoring, wildlife monitoring, weather and geological event monitoring, fleet management and tracking, remote security sensing, physical access control, and transaction-based business charging.

Some UEs 115 may be configured to employ operating modes that reduce power consumption, such as half-duplex communications (e.g., a mode that supports one-way communication via transmission or reception, but not transmission and reception simultaneously). In some examples, half-duplex communications may be performed at a reduced peak rate. Other power conservation techniques for the UEs 115 include entering a power saving deep sleep mode when not engaging in active communications, operating over a limited bandwidth (e.g., according to narrowband communications), or a combination of these techniques. For example, some UEs 115 may be configured for operation using a narrowband protocol type that is associated with a defined portion or range (e.g., set of subcarriers or resource blocks (RBs)) within a carrier, within a guard-band of a carrier, or outside of a carrier.

The wireless communications system 100 may be configured to support ultra-reliable communications or low-latency communications, or various combinations thereof. For example, the wireless communications system 100 may be configured to support ultra-reliable low-latency communications (URLLC) or mission critical communications. The UEs 115 may be designed to support ultra-reliable, low-latency, or critical functions (e.g., mission critical functions). Ultra-reliable communications may include private communication or group communication and may be supported by one or more mission critical services such as mission critical push-to-talk (MCPTT), mission critical video (MCVideo), or mission critical data (MCData). Support for mission critical functions may include prioritization of services, and mission critical services may be used for public safety or general commercial applications. The terms ultra-reliable, low-latency, mission critical, and ultra-reliable low-latency may be used interchangeably herein.

In some examples, a UE 115 may also be able to communicate directly with other UEs 115 over a device-to-device (D2D) communication link 135 (e.g., using a peer-to-peer (P2P) or D2D protocol). One or more UEs 115 utilizing D2D communications may be within the geographic coverage area 110 of a base station 105. Other UEs 115 in such a group may be outside the geographic coverage area 110 of a base station 105 or be otherwise unable to receive transmissions from a base station 105. In some examples, groups of the UEs 115 communicating via D2D communications may utilize a one-to-many (1:M) system in which each UE 115 transmits to every other UE 115 in the group. In some examples, a base station 105 facilitates the scheduling of resources for D2D communications. In other cases, D2D communications are carried out between the UEs 115 without the involvement of a base station 105.

In some systems, the D2D communication link 135 may be an example of a communication channel, such as a sidelink communication channel, between vehicles (e.g., UEs 115). In some examples, vehicles may communicate using vehicle-to-everything (V2X) communications, vehicle-to-vehicle (V2V) communications, or some combination of these. A vehicle may signal information related to traffic conditions, signal scheduling, weather, safety, emergencies, or any other information relevant to a V2X system. In some examples, vehicles in a V2X system may communicate with roadside infrastructure, such as roadside units, or with the network via one or more network nodes (e.g., base stations 105) using vehicle-to-network (V2N) communications, or with both.

The core network 130 may provide user authentication, access authorization, tracking, Internet Protocol (IP) connectivity, and other access, routing, or mobility functions. The core network 130 may be an evolved packet core (EPC) or 5G core (5GC), which may include at least one control plane entity that manages access and mobility (e.g., a mobility management entity (MIME), an access and mobility management function (AMF)) and at least one user plane entity that routes packets or interconnects to external networks (e.g., a serving gateway (S-GW), a Packet Data Network (PDN) gateway (P-GW), or a user plane function (UPF)). The control plane entity may manage non-access stratum (NAS) functions such as mobility, authentication, and bearer management for the UEs 115 served by the base stations 105 associated with the core network 130. User IP packets may be transferred through the user plane entity, which may provide IP address allocation as well as other functions. The user plane entity may be connected to IP services 150 for one or more network operators. The IP services 150 may include access to the Internet, Intranet(s), an IP Multimedia Subsystem (IMS), or a Packet-Switched Streaming Service.

Some of the network devices, such as a base station 105, may include subcomponents such as an access network entity 140, which may be an example of an access node controller (ANC). Each access network entity 140 may communicate with the UEs 115 through one or more other access network transmission entities 145, which may be referred to as radio heads, smart radio heads, or transmission/reception points (TRPs). Each access network transmission entity 145 may include one or more antenna panels. In some configurations, various functions of each access network entity 140 or base station 105 may be distributed across various network devices (e.g., radio heads and ANCs) or consolidated into a single network device (e.g., a base station 105).

The wireless communications system 100 may operate using one or more frequency bands, typically in the range of 300 megahertz (MHz) to 300 gigahertz (GHz). Generally, the region from 300 MHz to 3 GHz is known as the ultra-high frequency (UHF) region or decimeter band because the wavelengths range from approximately one decimeter to one meter in length. The UHF waves may be blocked or redirected by buildings and environmental features, but the waves may penetrate structures sufficiently for a macro cell to provide service to the UEs 115 located indoors. The transmission of UHF waves may be associated with smaller antennas and shorter ranges (e.g., less than 100 kilometers) compared to transmission using the smaller frequencies and longer waves of the high frequency (HF) or very high frequency (VHF) portion of the spectrum below 300 MHz.

The wireless communications system 100 may also operate in a super high frequency (SHF) region using frequency bands from 3 GHz to 30 GHz, also known as the centimeter band, or in an extremely high frequency (EHF) region of the spectrum (e.g., from 30 GHz to 300 GHz), also known as the millimeter band. In some examples, the wireless communications system 100 may support millimeter wave (mmW) communications between the UEs 115 and the base stations 105, and EHF antennas of the respective devices may be smaller and more closely spaced than UHF antennas. In some examples, this may facilitate use of antenna arrays within a device. The propagation of EHF transmissions, however, may be subject to even greater atmospheric attenuation and shorter range than SHF or UHF transmissions. The techniques disclosed herein may be employed across transmissions that use one or more different frequency regions, and designated use of bands across these frequency regions may differ by country or regulating body.

The wireless communications system 100 may utilize both licensed and unlicensed radio frequency spectrum bands. For example, the wireless communications system 100 may employ License Assisted Access (LAA), LTE-Unlicensed (LTE-U) radio access technology, or NR technology in an unlicensed band such as the 5 GHz industrial, scientific, and medical (ISM) band. When operating in unlicensed radio frequency spectrum bands, devices such as the base stations 105 and the UEs 115 may employ carrier sensing for collision detection and avoidance. In some examples, operations in unlicensed bands may be based on a carrier aggregation configuration in conjunction with component carriers operating in a licensed band (e.g., LAA). Operations in unlicensed spectrum may include downlink transmissions, uplink transmissions, P2P transmissions, or D2D transmissions, among other examples.

A base station 105 or a UE 115 may be equipped with multiple antennas, which may be used to employ techniques such as transmit diversity, receive diversity, multiple-input multiple-output (MIMO) communications, or beamforming. The antennas of a base station 105 or a UE 115 may be located within one or more antenna arrays or antenna panels, which may support MIMO operations or transmit or receive beamforming. For example, one or more base station antennas or antenna arrays may be co-located at an antenna assembly, such as an antenna tower. In some examples, antennas or antenna arrays associated with a base station 105 may be located in diverse geographic locations. A base station 105 may have an antenna array with a number of rows and columns of antenna ports that the base station 105 may use to support beamforming of communications with a UE 115. Likewise, a UE 115 may have one or more antenna arrays that may support various MIMO or beamforming operations. Additionally or alternatively, an antenna panel may support radio frequency beamforming for a signal transmitted via an antenna port.

The base stations 105 or the UEs 115 may use MIMO communications to exploit multipath signal propagation and increase the SPEF by transmitting or receiving multiple signals via different spatial layers. Such techniques may be referred to as spatial multiplexing. The multiple signals may, for example, be transmitted by the transmitting device via different antennas or different combinations of antennas. Likewise, the multiple signals may be received by the receiving device via different antennas or different combinations of antennas. Each of the multiple signals may be referred to as a separate spatial stream and may carry bits associated with the same data stream (e.g., the same codeword) or different data streams (e.g., different codewords). Different spatial layers may be associated with different antenna ports used for channel measurement and reporting. MIMO techniques include single-user MIMO (SU-MIMO), where multiple spatial layers are transmitted to the same receiving device, and multiple-user MIMO (MU-MIMO), where multiple spatial layers are transmitted to multiple devices.

Beamforming, which may also be referred to as spatial filtering, directional transmission, or directional reception, is a signal processing technique that may be used at a transmitting device or a receiving device (e.g., a base station 105, a UE 115) to shape or steer an antenna beam (e.g., a transmit beam, a receive beam) along a spatial path between the transmitting device and the receiving device. Beamforming may be achieved by combining the signals communicated via antenna elements of an antenna array such that some signals propagating at particular orientations with respect to an antenna array experience constructive interference while others experience destructive interference. The adjustment of signals communicated via the antenna elements may include a transmitting device or a receiving device applying amplitude offsets, phase offsets, or both to signals carried via the antenna elements associated with the device. The adjustments associated with each of the antenna elements may be defined by a beamforming weight set associated with a particular orientation (e.g., with respect to the antenna array of the transmitting device or receiving device, or with respect to some other orientation).

A base station 105 or a UE 115 may use beam sweeping techniques as part of beam forming operations. For example, a base station 105 may use multiple antennas or antenna arrays (e.g., antenna panels) to conduct beamforming operations for directional communications with a UE 115. Some signals (e.g., synchronization signals, reference signals, beam selection signals, or other control signals) may be transmitted by a base station 105 multiple times in different directions. For example, the base station 105 may transmit a signal according to different beamforming weight sets associated with different directions of transmission. Transmissions in different beam directions may be used to identify (e.g., by a transmitting device, such as a base station 105, or by a receiving device, such as a UE 115) a beam direction for later transmission or reception by the base station 105.

Some signals, such as data signals associated with a particular receiving device, may be transmitted by a base station 105 in a single beam direction (e.g., a direction associated with the receiving device, such as a UE 115). In some examples, the beam direction associated with transmissions along a single beam direction may be determined based on a signal that was transmitted in one or more beam directions. For example, a UE 115 may receive one or more of the signals transmitted by the base station 105 in different directions and may report to the base station 105 an indication of the signal that the UE 115 received with a highest signal quality or an otherwise acceptable signal quality.

In some examples, transmissions by a device (e.g., by a base station 105 or a UE 115) may be performed using multiple beam directions, and the device may use a combination of digital precoding or radio frequency beamforming to generate a combined beam for transmission (e.g., from a base station 105 to a UE 115). The UE 115 may report feedback that indicates precoding weights for one or more beam directions, and the feedback may correspond to a configured number of beams across a system bandwidth or one or more sub-bands. The base station 105 may transmit a reference signal (e.g., a cell-specific reference signal (CRS), a channel state information reference signal (CSI-RS)), which may be precoded or unprecoded. The UE 115 may provide feedback for beam selection, which may be a precoding matrix indicator (PMI) or codebook-based feedback (e.g., a multi-panel type codebook, a linear combination type codebook, a port selection type codebook). Although these techniques are described with reference to signals transmitted in one or more directions by a base station 105, a UE 115 may employ similar techniques for transmitting signals multiple times in different directions (e.g., for identifying a beam direction for subsequent transmission or reception by the UE 115) or for transmitting a signal in a single direction (e.g., for transmitting data to a receiving device).

A receiving device (e.g., a UE 115) may try multiple receive configurations (e.g., directional listening) when receiving various signals from the base station 105, such as synchronization signals, reference signals, beam selection signals, or other control signals. For example, a receiving device may try multiple receive directions by receiving via different antenna subarrays, by processing received signals according to different antenna subarrays, by receiving according to different receive beamforming weight sets (e.g., different directional listening weight sets) applied to signals received at multiple antenna elements of an antenna array, or by processing received signals according to different receive beamforming weight sets applied to signals received at multiple antenna elements of an antenna array, any of which may be referred to as "listening" according to different receive configurations or receive directions. In some examples, a receiving device may use a single receive configuration to receive along a single beam direction (e.g., when receiving a data signal). The single receive configuration may be aligned in a beam direction determined based on listening according to different receive configuration directions (e.g., a beam direction determined to have a highest signal strength, highest signal-to-noise ratio (SNR), or otherwise acceptable signal quality based on listening according to multiple beam directions).

The wireless communications system 100 may be a packet-based network that operates according to a layered protocol stack. In the user plane, communications at the bearer or Packet Data Convergence Protocol (PDCP) layer may be IP-based. A Radio Link Control (RLC) layer may perform packet segmentation and reassembly to communicate over logical channels. A Medium Access Control (MAC) layer may perform priority handling and multiplexing of logical channels into transport channels.

The MAC layer may also use error detection techniques, error correction techniques, or both to support retransmissions at the MAC layer to improve link efficiency. In the control plane, the Radio Resource Control (RRC) protocol layer may provide establishment, configuration, and maintenance of an RRC connection between a UE 115 and a base station 105 or a core network 130 supporting radio bearers for user plane data. At the physical layer, transport channels may be mapped to physical channels.

The UEs 115 and the base stations 105 may support retransmissions of data to increase the likelihood that data is received successfully. Hybrid automatic repeat request (HARQ) feedback is one technique for increasing the likelihood that data is received correctly over a communication link 125. HARQ may include a combination of error detection (e.g., using a cyclic redundancy check (CRC)), forward error correction (FEC), and retransmission (e.g., automatic repeat request (ARQ)). HARQ may improve throughput at the MAC layer in poor radio conditions (e.g., low signal-to-noise conditions). In some examples, a device may support same-slot HARQ feedback, where the device may provide HARQ feedback in a specific slot for data received in a previous symbol in the slot. In other cases, the device may provide HARQ feedback in a subsequent slot, or according to some other time interval.

A UE 115 operating in wireless communications system 100 may use an STM to evaluate traffic statistics for receiving downlink information from a base station 105. Accordingly, the UE 115 may transition between different receive states using different numbers of active receive antennas. For example, if a UE 115 is in a first state such as an ARx standby state, the UE 115 may use up to 4 Rx antennas based on the number of downlink grants the UE 115 receives during a time interval. If the number of grants that the UE receives over the time interval falls below a threshold, however, the UE 115 may transition to a second state such as an ARx disallowed state, where the UE 115 may use up to 2 Rx antennas based on downlink traffic.

In some cases, the UE 115 may implement a number of techniques that may allow for more adaptive measurement of traffic conditions based on a weighted calculation of SPEF for received downlink grants. For example, the UE 115 may calculate a weighting factor (II) based on a ratio between granted SPEF (e.g., the number of information bits per resource element that is scheduled for the UE 115) and reported SPEF (e.g., an estimate of information bits per resource element that it can decode reliably). The UE 115 may apply 77 to a burst detection function which is used to count the number of grants received by the UE 115 operating in an ARx disallowed state. If the number of weighted grants determined by the weighted burst detection function exceeds a threshold, then the UE 115 may transition to an ARx standby state. In addition, the UE 115 may apply η to a scheduling rate function while operating in the ARx standby state to determine the weighted scheduling rate for received downlink grants. If the weighted scheduling rate for the downlink grants falls below a threshold, then the UE 115 may transition to the ARx disallowed state.

Figure 2:
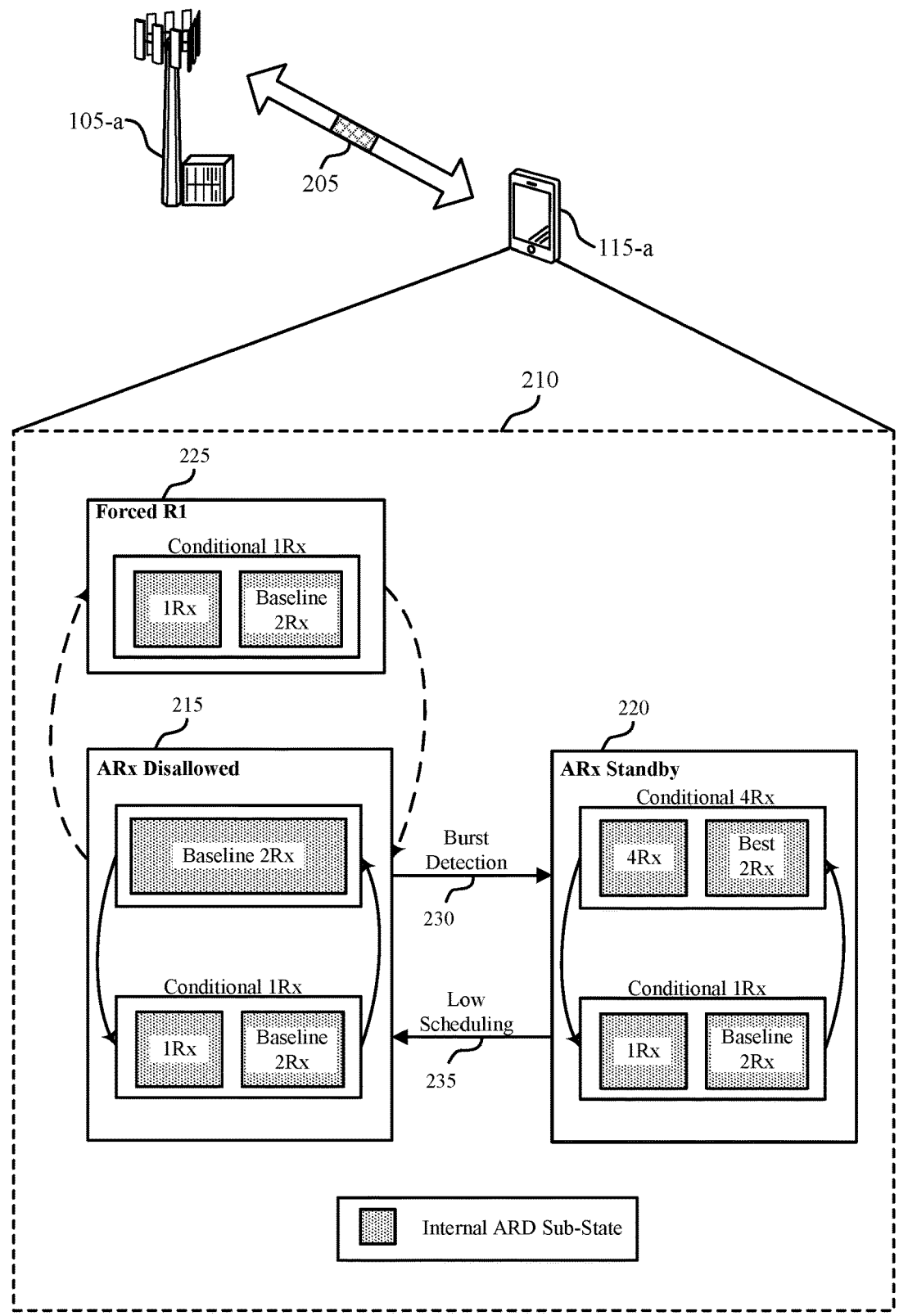
FIG. 2 illustrates an example of a wireless communications system that supports advanced adaptive receivers based on SPEF utilization in accordance with aspects of the present disclosure.

FIG. 2 illustrates an example of a wireless communications system 200 that supports advanced adaptive receivers based on SPEF utilization in accordance with aspects of the present disclosure. In some examples, the wireless communications system 200 may implement aspects of the wireless communications system 100. For example, wireless communications system 200 may support communications between a UE 115-a and a base station 105-a, which may be examples of corresponding devices as described with reference to FIG. 1. In addition, the UE 115-a may support advanced receiver features that enhance downlink communications between the UE 115-a and base station 105-b.

The UE 115-a may use STM 210 to evaluate both long-term and short-term traffic statistics (specifically a downlink traffic pattern) received from the base station 105-a. For example, the STM may include a number of macro states (e.g., states 215 and 220) to capture long-term statistics, and sub-states within each macro state 215 and 220 which may identify a number of power saving opportunities from short-term traffic statistics (e.g., such as opportunities for the UE 115-a to reduce the number of receive antennas used to accommodate downlink traffic).

The UE 115-a may use the STM 210 may evaluate the number of downlink grants 205 received from the base station 105-a in a given time interval, the coding rate associated with each downlink grant, and an information payload associated with the downlink grants 205 (e.g., the number of bits per resource element) that the UE 115-a can reliably decode, among other metrics. In some examples, the UE 115-a may use the STM 210, the UE 115-a may operate using ARD which refers to the management of the number of receive antennas to minimize UE 115-a power expenditure and to improve the power-performance trade-off for the UE 115-a.

The implementation of ARD may enable the UE 115-a to transition between a number of antenna configurations (e.g., 1Rx, Baseline 2Rx, Best 2Rx, or 4Rx) based on downlink traffic pattern (e.g., the inter-arrival time between grants or grant size) and some radio frequency (RF) network conditions (e.g., reference signal receive power (RSRP), signal to noise ratio (SNR), antenna correlation, SPEF, etc.). In some examples, the use of ARD (for example, reporting highest Rx readiness to the network through rank reporting and other channel state function (CSF) metrics) may allow the UE 115-a to reduce power consumption while increasing the efficiency of downlink scheduling from the base station 105-a. In addition to ARD, the STM 210 may drive other advanced receiver (ARx) features such as cell-specific reference signal (CRS) interference cancellation (IC) among other features.

In some examples, the STM 210 may enable macro state transitions which relate to different receiver state configurations supported by the UE 115-a based on an evaluation of long-term or short-term downlink traffic statistics. For example, the UE 115-a may enter a first ARx state, such as an ARx standby state 220, which may be implemented when the downlink traffic exceeds a threshold (e.g., the number of downlink grants 205 counted by the STM 210 during a time interval is above a threshold number), indicating a significant amount of downlink traffic. While in the ARx standby state 220, the UE 115-a may operate in accordance to a number of sub-states of the macro-state 220. For example, the UE 115-a may operate in a conditional 4× state, in which the UE 115-a uses 4× or the "best 2×" antennas. Additionally or alternatively, the UE 115 may operate in a conditional 1× state, and may use 1Rx or baseline 2Rx antennas, depending on the various system conditions.

If the number of downlink grants 205 received falls below a threshold, the UE 115-a may transition to an ARx disallowed state 215. For example, while operating in ARx Standby state 220, the UE 115-a may compute scheduling rate (SR) as a moving average of the number of downlink grants 205 received in a previous number of downlink subframes (e.g., 200 previous downlink subframes). If the calculated scheduling rate falls below a threshold percentage (e.g., 10%), then the UE 115-a may transition to the ARx disallowed state.

While operating in the ARx disallowed state 215, the UE 115-a may use up to the baseline 2Rx antennas (a configuration that uses the antennas indexed 0 and 1, Rx01), including 1 Rx and baseline 2Rx antenna configurations. If the number of downlink grants 205 the UE 115-a receives during the time interval surpasses the threshold, the UE 115-a may transition back to the ARx standby state 220. For example, the UE 115-a may evaluate a burst detection criteria 230 to determine a number of grants received in a threshold time period (e.g., if the UE 115-a detect $\geq \rho_B$ downlink grants in $W_B$ consecutive downlink subframes within a discontinuous reception active period, where $\rho_B=5$, $W_B=32$).

If the number of downlink grants 205 the UE 115-a receives during the time interval falls below the threshold for ARx disallowed, the UE 115-a may transition to a Forced Rank 1 state 225 (e.g., trivial downlink utilization). In such cases, the channel state feedback reporting is forced to rank=1, and the UE 115-a may remain in 1Rx to save power. For example, the UE 115-a may compute utilization rate as the moving average of grant size or total capacity, and when the utilization rate is less than a threshold (e.g., less than 2%), the UE 115-a may transition from ARx Disallowed to Forced R1. When the utilization rate is above a threshold (e.g., more than 2%), the UE 115-a may transition from Forced R1 to ARx Disallowed. The UE 115-a may base the determination to transition between various ARx states exclusively on the number of downlink grants 205 received during the defined time interval.

Within each macro state (e.g., ARx standby, ARx disallowed, or Forced R1) there are steady state and conditional 1Rx (C1Rx) sub-states. The steady state sub-state may be implemented for normal operation while the UE 115-a receives downlink traffic, while the C1Rx state may be implemented after downlink reception is idle for threshold subframes (e.g., if a downlink grant is not received for $W_{FB0}=20$ or $W_{FB1}=48$ downlink subframes, the UE 115-a may stay in the C1Rx state). In some cases, the UE 115-a may remain in C1Rx mode to save power while maintaining physical downlink control channel (PDCCH) performance.

In some cases, however, transitioning between ARx states of the STM 210 may be based solely on a count of the number of received downlink grants 205 during a time interval, which may reduce power savings for the UE 115-a. For example, if the UE 115-a is in the ARx disallowed state 215 with the baseline 2Rx antenna configuration enabled, the UE 115-a may decode both 1 layer and 2 layer downlink grants 205 scheduled by the base station 105-a such that the burst detection criteria 230 is met, which may enable transition to ARx Standby where the UE 115-a enables 4Rx and consumes more power. But since 2Rx may be sufficient to decode up to two-layer grants, the UE 115-a should stay in the ARx Disallowed state to conserve power (but may still transition to ARx Standby based on the grant count). Additionally or alternatively, if the UE 115-a is in ARx Standby state but the base station 105-a schedules 1 or 2 layer grants such that the scheduling rate exceeds the low scheduling threshold 235, then UE 115-a may stay in 4Rx and consume more power when it should transition to ARx Disallowed with 2Rx without incurring any throughput penalty.

In some other examples, the UE 115-a may use a calculation of utilization rate (UR) to trigger an ARx state transition. The utilization rate may be defined as:

$$UR = \frac{TB \text{ Size}}{SPEF \times \#RE}$$

where transport block (TB) size is the number of information bits transmitted in one subframe, the SPEF is based on a most recent channel quality indicator (CQI), and the #RE is the number of resource elements across the entire frequency bandwidth used by the base station 105-a for transmitting downlink grants 205 to the UE 115-a. The UE 115-a may use the utilization rate value to trigger a transition between ARx states. Utilization rate, however, may not be an efficient metric to trigger a state transition because downlink grants 205 with a high modulation coding scheme (MCS) values may have a small resource block allocation, thus a smaller frequency bandwidth, which may correspond to a low UR value. For example, when a signal to noise ratio (SNR) for the channel used for downlink grant transmissions is below a threshold, the UE 115-a may transition to the 4Rx antenna configuration to achieve a better block error ratio (BLER) and achieve a higher signal throughput.

In such examples, if the UE 115-a is in the ARx disallowed state 215, the utilization rate associated with received downlink grants 205 may be too low to allow the UE 115-a to transition to the ARx standby state 220 to enable the 4Rx antenna configuration, thus the UE 115-a may continue to incur a higher BLER. Conversely, if the UE 115-a is currently in the ARx Standby state, the low utilization rate downlink grants 205 may trigger the UE 115-a to transition to the ARx disallowed state 215, thus incurring a higher BLER. Additionally or alternatively, if the SNR for the channel is above a threshold, the UE 115-a may determine to transition to the ARx standby state 220 and enable the 4Rx antenna configuration, but if the utilization rate associated with the downlink grants 205 is below the threshold, the UE 115-a may be unable to transition which may result in a lower throughput.

To more adaptively measure traffic conditions, and to more accurately determine times in which to transition to different receive states, the UE 115-a may implement a number of different techniques which implement spectral efficiency (SPEF) of the number of grants scheduled by the base station 105-a, and the number of grants that are decoded by the UE 115-a. For example, adaptively measure traffic conditions based on a weighted calculation of SPEF for received downlink grants. The UE 115-a may calculate a weighting factor based on a ratio between granted SPEF (e.g., the number of information bits per resource element that is scheduled for the UE 115-a) and reported SPEF (e.g., an estimate of information bits per resource element that the UE 115-a can decode reliably). Specifically, the weighting factor may be defined as η, where:

$$\eta[n] := \frac{\text{granted\_spef}([n]}{\text{reported\_spef}[n]}.$$

The UE may apply η to a burst detection function 230 which is used to count the number of grants received by the UE 115-a operating in the ARx disallowed state 215. If the number of weighted grants determined by the weighted burst detection function exceeds a threshold, then the UE 115-a may transition to the ARx standby state 220. In addition, the UE 115-*a* may apply η to a scheduling rate function 235 while operating in the ARx standby state 220 to determine the weighted scheduling rate for received downlink grants. If the weighted scheduling rate for the downlink grants falls below a threshold, then the UE 115-*a* may transition to the ARx disallowed state.

Figure 3:
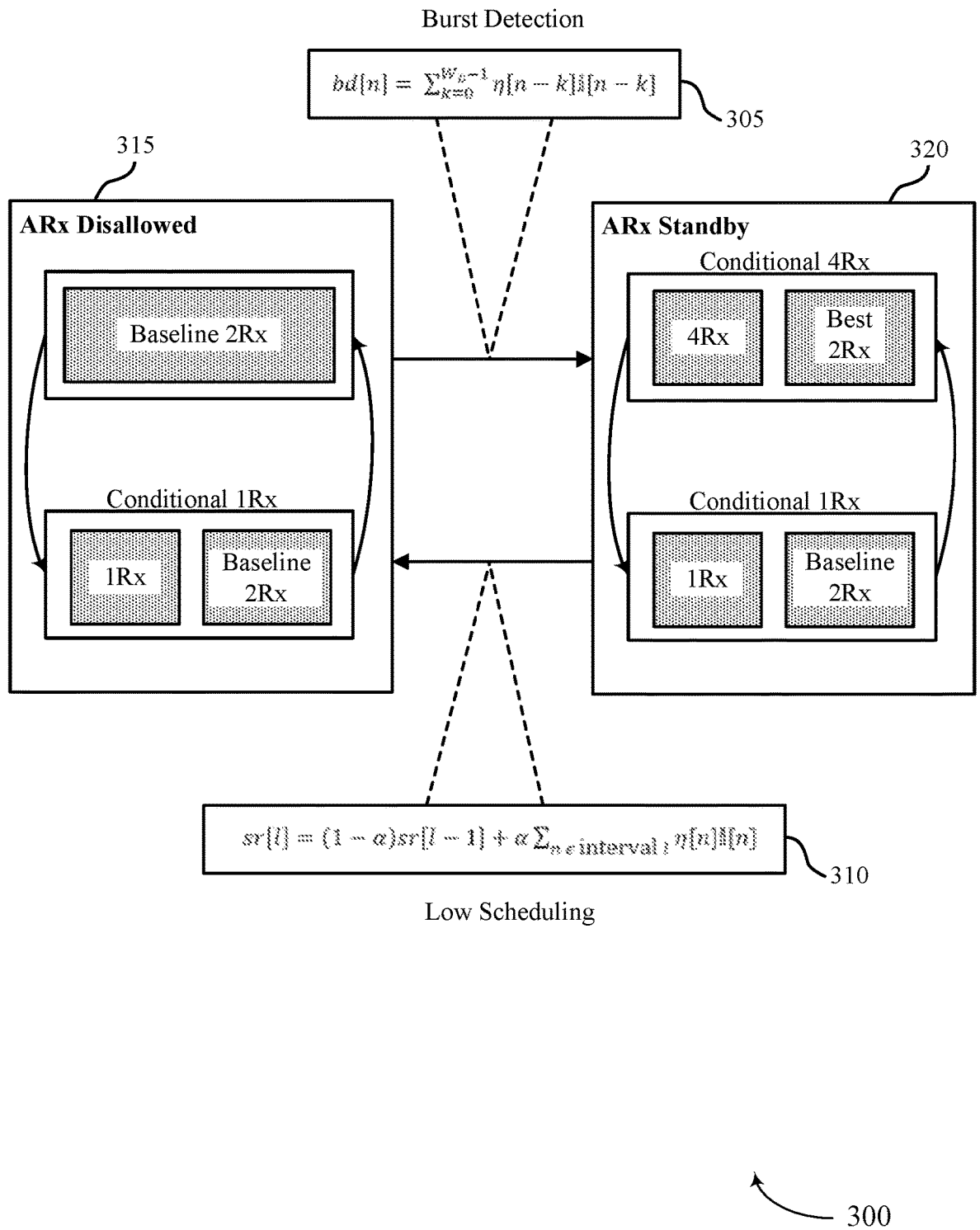
FIG. 3 illustrates an example of a traffic state machine (STM) configuration that supports advanced adaptive receivers based on SPEF utilization in accordance with aspects of the present disclosure.

FIG. 3 illustrates an example of an STM configuration 300 that supports advanced adaptive receivers based on SPEF utilization in accordance with aspects of the present disclosure. In some examples, the STM configuration 300 may be an example of the STM 210 described with reference to FIG. 2, and may be implemented by devices (such as a UE 115) described with reference to FIGS. 1 and 2. A UE may use STM 300 to evaluate both long-term and short-term traffic statistics (e.g., a downlink traffic pattern) received from a network entity. The STM 300 may include a number of macro states (e.g., states 315 and 320) to capture long-term statistics, and sub-states within each macro state. The STM 300 may include additional macro-states and sub-states to those included in the example of FIG. 3, for example, the STM 300 may include an additional forced R1 macro-state for low scheduling or idle operation scenarios.

To effectively transition between the various ARx states of the STM 300, the UE may implement techniques to adaptively measure downlink traffic conditions based on SPEF associated with the received downlink grants, and the UE may determine a moving weighted average of the SPEF associated with downlink grants received from the network. For example, the UE may calculate a weighting factor function that is a ratio of a granted SPEF (e.g., the number of bits per resource element that the network schedules to the UE) and a reported SPEF (e.g., an estimate of the number of bits per resource element that the UE may reliably decode). For example, the weighted factor function may be defined as where:

$$\eta[n] := \frac{\text{granted\_spef}[n]}{\text{reported\_spef}[n]}$$

For each grant received from the network, the UE may define granted_spef as:=$\Sigma_{q=0}^{Q} l_q c_q m_q$ (e.g., information bits per RE), where Q is the number of code words, $l_q$ is the number of layers, $c_q$ is a coding rate, and $m_q$ is the modulation order for code word q. The UE may report channel state information (CSI) to the network including a rank indication (RI) (e.g., a degree of spatial multiplexing that the channel supports as the number of layers in a transmission) and a channel quality index (CQI) (e.g., the maximum code rate and modulation order of a transmission that the UE can decode reliably). The UE may in some cases obtain CSI by computing SPEF and mapping the computed SPEF to RI and CQI. This in some cases may be the reported_spef which may be the UE estimate of the info bits per RE that it may reliably decode.

The ratio η, which compares granted SPEF to reported SPEF, may in some cases drive transitions between ARx Disallowed state 315 and ARx Standby state 320. For example, the UE may apply the η to various traffic condition calculations to determine whether to transition between the ARx states 315 and 320. For example, while in the ARx disallowed state 315, the UE may apply η to a burst detection function 305:

$$bd[n] = \sum_{k=0}^{W_b-1} \eta[n-k]i[n-k]$$

where i [k] is an indicator function given by:

$$i[k] = \begin{cases} 1, & \text{if grant is received in subframe}[k] \\ 0, & \text{otherwise} \end{cases}$$

By implementing the weighted burst detection factor 305, the UE may more accurately determine the density of downlink traffic. The UE may compare the weighted burst detection bd[n] to a threshold $\rho_B$ to determine whether to transition from the ARx disallowed state 315 to the ARx standby state 320. For example, if bd[n]>$\rho_B$, then the UE may transition from ARx disallowed 315 to ARx standby 320, and if bd[n]<$\rho_B$ the UE may stay in the ARx disallowed state 315. In some cases, the threshold $\rho_B$ may be a configurable threshold (e.g., a threshold that is configured by the network, which may be signaled to the UE), or the threshold $\rho_B$ may be a static threshold identified by the UE.

In addition to burst detection, the UE may apply η to a scheduling rate function 310 which may be used to evaluate downlink traffic while the UE is in the ARx standby state 320. For example, the low scheduling rate function may be given by:

$$sr[l] = (1-\alpha)sr[l=1] + \alpha \sum_{n \in interval\ l} \eta[h]i[n]$$

where l denotes the $l^{th}$ update (e.g., a periodic scheduling update occurring every 100 ms), α is a moving average filter parameter, and where i [k] is an indicator function.

The UE may compare the weighted scheduling rate function sr[l] to a threshold $\rho_s$ to determine whether to transition from the ARx standby state 320 to the ARx disallowed state 315. For example, if sr[l]<$\rho_s$, then the UE may transition from ARx Standby 320 to ARx Disallowed 315, and if sr[l]>$\rho_s$ the UE may stay in the ARx Standby state 320. In some cases, the threshold $\rho_s$ may be a configurable threshold (e.g., a threshold percentage such as 25% or 10% that is configured by the network, which may be signaled to the UE), or the threshold $\rho_s$ may be a static threshold identified by the UE. In addition, the filter parameter a may be configurable (e.g., a may be 100 ms).

The UE may determine a moving average scheduling rate for the downlink grants 205, and if the scheduling rate falls below a threshold, the UE 115-*a* may transition back to the ARx disallowed state 215 in response to the decrease in downlink traffic. The ρ-factor allows the UE 115-*a* to more effectively balance power consumption and data reception thus increasing UE 115-*a* power saving capabilities and overall UE 115-*a* performance.

By applying η weighting factor to the burst detection function 305 and low scheduling function 310, the UE may effectively evaluate the fraction of the channel capacity that the network is utilizing, and may determine ARx state transitions based on both grant count and size, and system capacity. These techniques may increase power savings and performance for the UE, while increasing overall traffic throughput.

Figure 4:
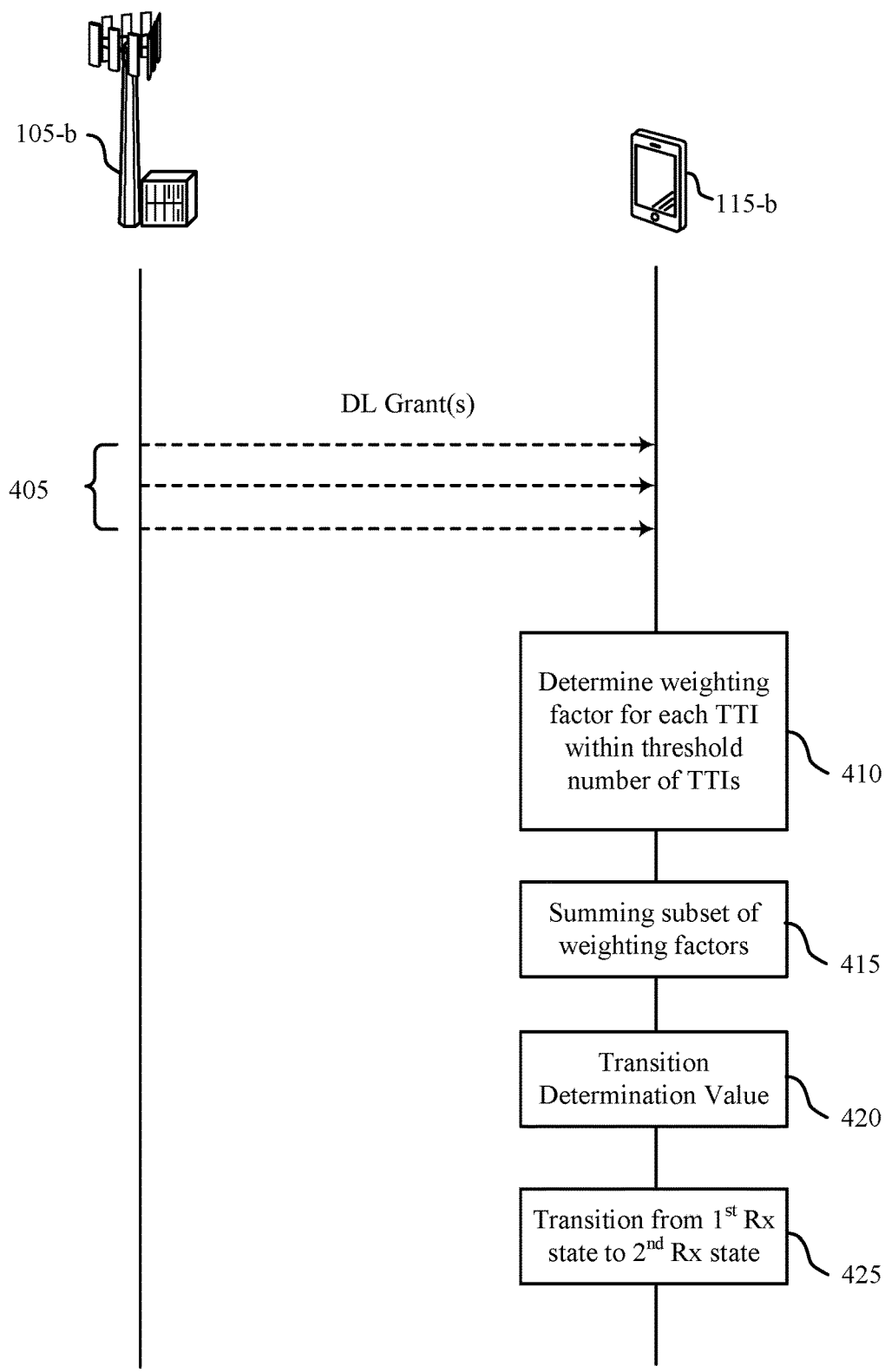
FIG. 4 illustrates an example of a process flow that supports advanced adaptive receivers based on SPEF utilization in accordance with aspects of the present disclosure.

FIG. 4 illustrates an example of a process flow 400 that supports advanced adaptive receivers based on SPEF utilization in accordance with aspects of the present disclosure. In some examples, the process flow 400 may be related to aspects of the wireless communications system 100 or the wireless communications system 200. For example, the process flow 400 may be implemented by a base station 105-*b* and a UE 115-*b*, which may be examples of a base station and a UE as described herein.

At 405, the base station 105-*b* may transmit, and the UE 115-*b* may receive, a number of downlink grants (e.g., layer 1 or layer 2 grants) within a threshold number of TTIs. The UE 115-*b* may receive one or more downlink grants while operating in accordance with a first receive state of a number of receive states.

At 410, the UE 115-*b* may determine a weighting factor for each TTI within the threshold number of TTIs, and each weighting factor determined by the UE 115-*b* may be based on a SPEF for channel communications between the base station 105-*b* and the UE 115-*a*. In some cases, the weighting factor may be a function of a subframe index of the one or more downlink grants.

In some examples, the UE 115-*b* may determine SPEF for each TTI based on a ratio between a first SPEF associated with scheduled information bits per resource element scheduled by the base station 105-*b* and a second SPEF associated with a number of information bits per resource element the UE 115-*b* is capable of decoding. In some examples, the UE 115-*b* may determine the first SPEF by summing one or more SPEF values for one or more respective code words of a downlink grant (e.g., received in 405). In such examples, each of the one or more SPEF values may be a product of a number of layers associated with the downlink grant, a code rate, and a modulation order for individual ones of the one or more respective code words. The UE 115-*b* may further determine the second SPEF based on an estimated capability of the UE 115-*b* to decode the number of information bits per resource element. In some cases, the UE 115-*b* may transmit a CSI report to the base station 105-*b* based on a determined mapping between the second SPEF and a rank indication, and channel quality index, or both.

At 415, the UE 115-*b* may sum at least a subset of the weighting factors in order to identify a transition determination value for the UE 115-*b* to transition from the first receive state to a second receive state (e.g., where the first receive state is associated with a first number of receive antennas and the second receive state is associated with a second number of receive antennas). For example, in some cases, the UE 115-*b* may sum individual weighting factors that correspond to individual TTIs of the threshold number of TTIs that have at least one of the one or more downlink grants.

At 420, the UE 115-*b* may identify the transition determination value. In some examples, the transition determination value may be a burst detection transition determination value that is based on the summing of at least the subset of the weighting factors in accordance with a burst detection function. Based on the burst detection function and the burst detection transition determination value, the UE 115-*b* may determine whether to transition from the first receive state to the second receive state (e.g., from a receive disallowed state to a receive standby state). The UE 115-*b* may compare the burst detection transition determination value to a threshold burst detection transition determination value, and may determine whether to transition from the first receive state to the second receive state based on the comparison. For example, in cases where the burst detection transition determination value exceeds the threshold burst detection transition determination value, the UE 115-*b* may determine to transition to the first receive state to the second receive state. The threshold burst detection transition determination value may be configured based on long-term downlink traffic statistics, short-term downlink traffic statistics, or both.

In some other examples, the transition determination value may be a scheduling rate transition determination value that the UE 115-*b* may determine by summing at least the subset of the weighting factors in accordance with a scheduling rate function. The UE 115-*b* may determine whether to transition from the first receive state to the second receive state (e.g., from a receive standby stat to a receive disallowed state) based on the scheduling rate transition determination value. In some cases, the UE 115-*b* may compare the transition determination value to a threshold scheduling rate transition determination value, and may determine whether to transition from the first receive state to the second receive state based on the comparison. For example, the UE 115-*b* may determine to transition from the first receive state to the second receive state based on the scheduling rate transition determination value exceeding the threshold scheduling rate transition determination value. In some examples, the transition determination value may be configured based on long-term downlink traffic statistics, short-term downlink traffic statistics, or both.

At 425, the UE 115-*b* may transition from the first receive state to a second receive state of the number of receive states based on the transition determination value.

Figure 5:
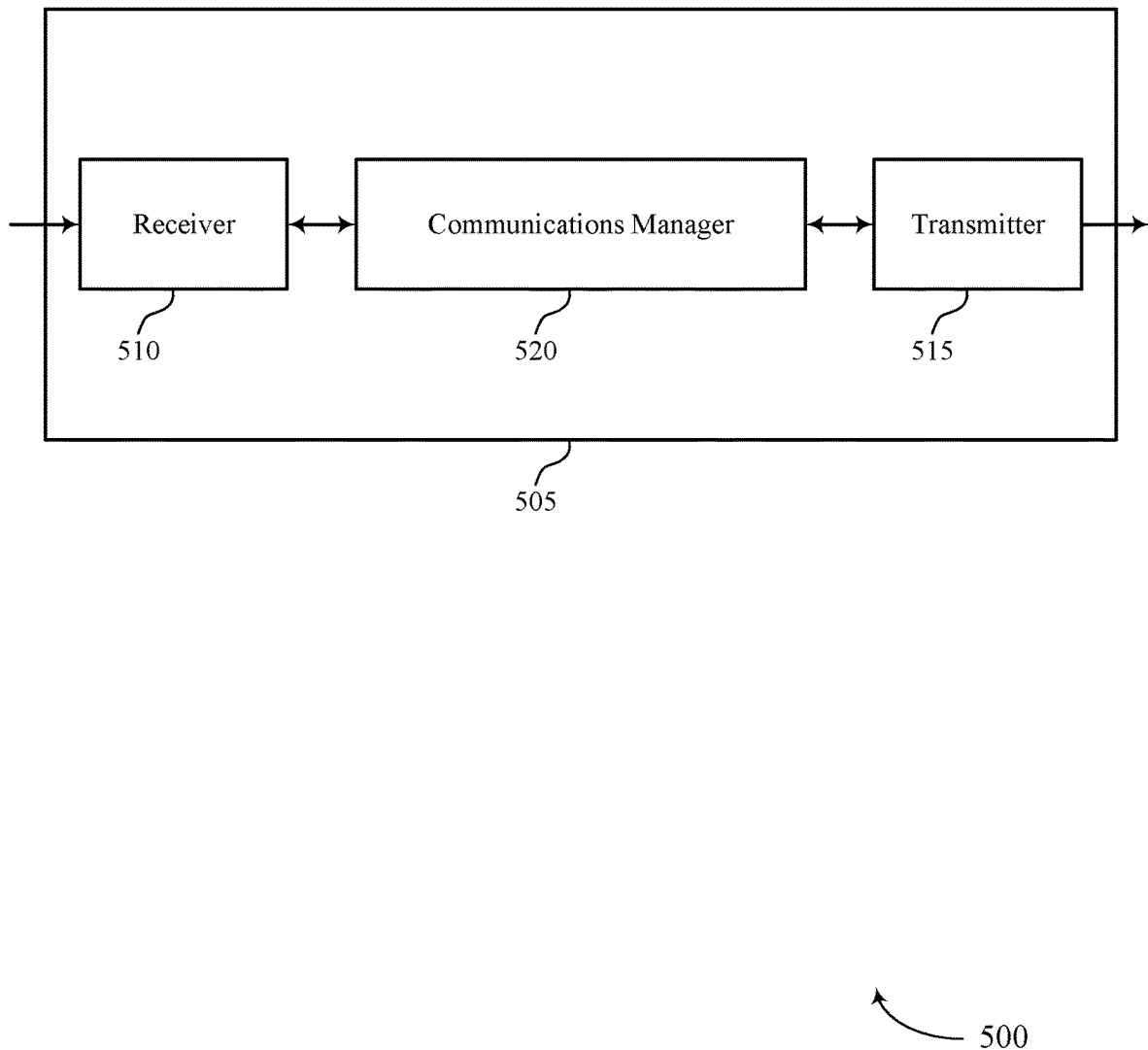
FIGS. 5 and 6 show block diagrams of devices that support advanced adaptive receivers based on SPEF utilization in accordance with aspects of the present disclosure.

FIG. 5 shows a block diagram 500 of a device 505 that supports advanced adaptive receivers based on SPEF utilization in accordance with aspects of the present disclosure. The device 505 may be an example of aspects of a UE 115 as described herein. The device 505 may include a receiver 510, a transmitter 515, and a communications manager 520. The device 505 may also include a processor. Each of these components may be in communication with one another (e.g., via one or more buses).

The receiver 510 may provide a means for receiving information such as packets, user data, control information, or any combination thereof associated with various information channels (e.g., control channels, data channels, information channels related to advanced adaptive receivers based on SPEF utilization). Information may be passed on to other components of the device 505. The receiver 510 may utilize a single antenna or a set of multiple antennas.

The transmitter 515 may provide a means for transmitting signals generated by other components of the device 505. For example, the transmitter 515 may transmit information such as packets, user data, control information, or any combination thereof associated with various information channels (e.g., control channels, data channels, information channels related to advanced adaptive receivers based on SPEF utilization). In some examples, the transmitter 515 may be co-located with a receiver 510 in a transceiver module. The transmitter 515 may utilize a single antenna or a set of multiple antennas.

The communications manager 520, the receiver 510, the transmitter 515, or various combinations thereof or various components thereof may be examples of means for performing various aspects of advanced adaptive receivers based on SPEF utilization as described herein. For example, the communications manager 520, the receiver 510, the transmitter 515, or various combinations or components thereof may support a method for performing one or more of the functions described herein.

In some examples, the communications manager 520, the receiver 510, the transmitter 515, or various combinations or components thereof may be implemented in hardware (e.g., in communications management circuitry). The hardware may include a processor, a digital signal processor (DSP), an application-specific integrated circuit (ASIC), a field-programmable gate array (FPGA) or other programmable logic device, a discrete gate or transistor logic, discrete hardware components, or any combination thereof configured as or otherwise supporting a means for performing the functions described in the present disclosure. In some examples, a processor and memory coupled with the processor may be configured to perform one or more of the functions described herein (e.g., by executing, by the processor, instructions stored in the memory).

Additionally or alternatively, in some examples, the communications manager 520, the receiver 510, the transmitter 515, or various combinations or components thereof may be implemented in code (e.g., as communications management software or firmware) executed by a processor. If implemented in code executed by a processor, the functions of the communications manager 520, the receiver 510, the transmitter 515, or various combinations or components thereof may be performed by a general-purpose processor, a DSP, a central processing unit (CPU), an ASIC, an FPGA, or any combination of these or other programmable logic devices (e.g., configured as or otherwise supporting a means for performing the functions described in the present disclosure).

In some examples, the communications manager 520 may be configured to perform various operations (e.g., receiving, monitoring, transmitting) using or otherwise in cooperation with the receiver 510, the transmitter 515, or both. For example, the communications manager 520 may receive information from the receiver 510, send information to the transmitter 515, or be integrated in combination with the receiver 510, the transmitter 515, or both to receive information, transmit information, or perform various other operations as described herein.

The communications manager 520 may support wireless communications at a UE in accordance with examples as disclosed herein. For example, the communications manager 520 may be configured as or otherwise support a means for receiving, from a base station and within a threshold number of TTIs, one or more downlink grants while operating in accordance with a first receive state of a set of multiple receive states at the UE. The communications manager 520 may be configured as or otherwise support a means for determining a weighting factor for each TTI within the threshold number of TTIs, the weighting factors each based on a SPEF of channel communications between the base station and the UE. The communications manager 520 may be configured as or otherwise support a means for summing at least a subset of the weighting factors in order to identify a transition determination value. The communications manager 520 may be configured as or otherwise support a means for transitioning from the first receive state to a second receive state of the set of multiple receive states based on the transition determination value.

By including or configuring the communications manager 520 in accordance with examples as described herein, the device 505 (e.g., a processor controlling or otherwise coupled to the receiver 510, the transmitter 515, the communications manager 520, or a combination thereof) may support techniques for reduced processing, reduced power consumption, and more efficient utilization of communication resources.

Figure 6:
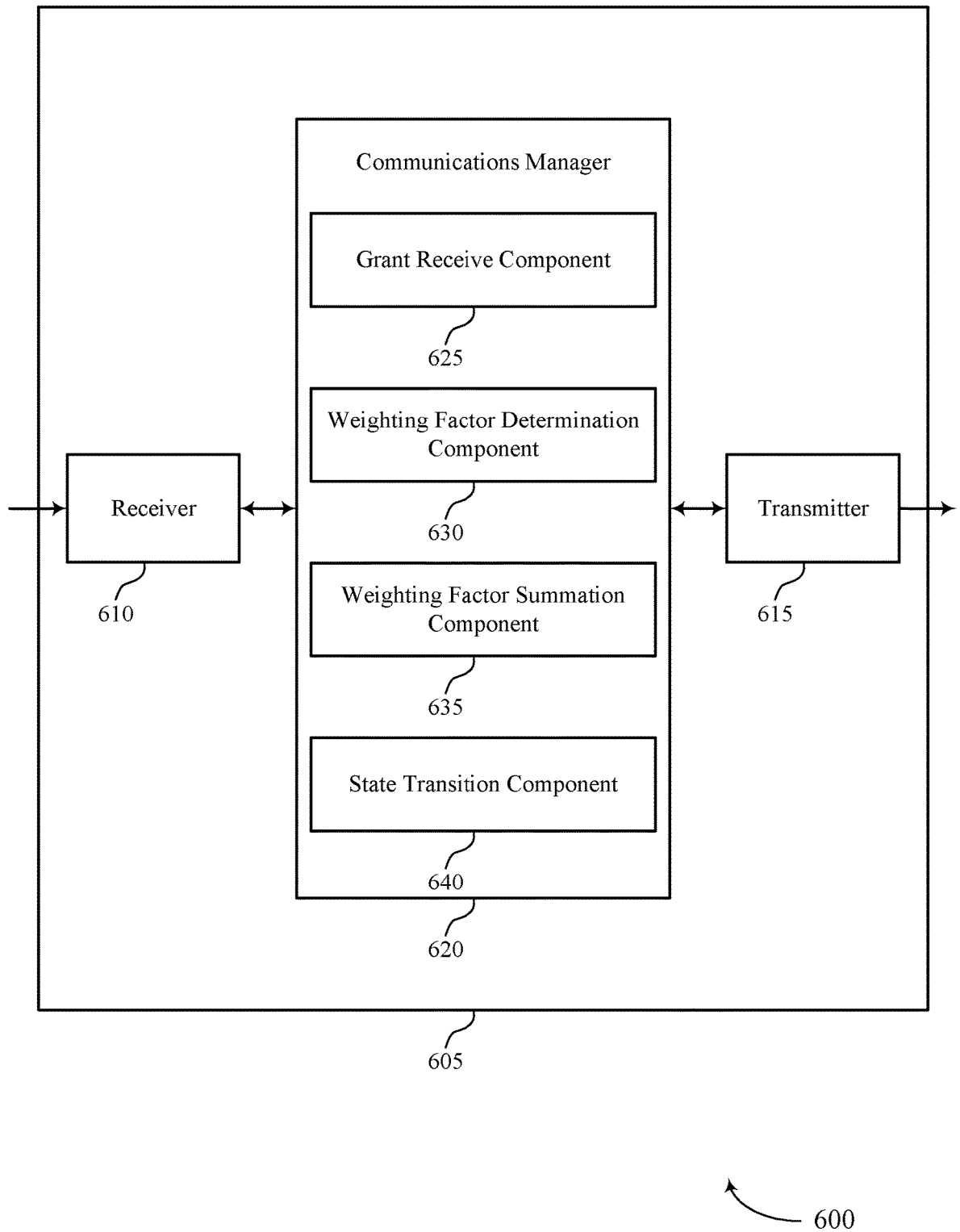

FIG. 6 shows a block diagram 600 of a device 605 that supports advanced adaptive receivers based on SPEF utilization in accordance with aspects of the present disclosure.

The device 605 may be an example of aspects of a device 505 or a UE 115 as described herein. The device 605 may include a receiver 610, a transmitter 615, and a communications manager 620. The device 605 may also include a processor. Each of these components may be in communication with one another (e.g., via one or more buses).

The receiver 610 may provide a means for receiving information such as packets, user data, control information, or any combination thereof associated with various information channels (e.g., control channels, data channels, information channels related to advanced adaptive receivers based on SPEF utilization). Information may be passed on to other components of the device 605. The receiver 610 may utilize a single antenna or a set of multiple antennas.

The transmitter 615 may provide a means for transmitting signals generated by other components of the device 605. For example, the transmitter 615 may transmit information such as packets, user data, control information, or any combination thereof associated with various information channels (e.g., control channels, data channels, information channels related to advanced adaptive receivers based on SPEF utilization). In some examples, the transmitter 615 may be co-located with a receiver 610 in a transceiver module. The transmitter 615 may utilize a single antenna or a set of multiple antennas.

The device 605, or various components thereof, may be an example of means for performing various aspects of advanced adaptive receivers based on SPEF utilization as described herein. For example, the communications manager 620 may include a grant receive component 625, a weighting factor determination component 630, a weighting factor summation component 635, a state transition component 640, or any combination thereof. The communications manager 620 may be an example of aspects of a communications manager 520 as described herein. In some examples, the communications manager 620, or various components thereof, may be configured to perform various operations (e.g., receiving, monitoring, transmitting) using or otherwise in cooperation with the receiver 610, the transmitter 615, or both. For example, the communications manager 620 may receive information from the receiver 610, send information to the transmitter 615, or be integrated in combination with the receiver 610, the transmitter 615, or both to receive information, transmit information, or perform various other operations as described herein.

The communications manager 620 may support wireless communications at a UE in accordance with examples as disclosed herein. The grant receive component 625 may be configured as or otherwise support a means for receiving, from a base station and within a threshold number of TTIs, one or more downlink grants while operating in accordance with a first receive state of a set of multiple receive states at the UE. The weighting factor determination component 630 may be configured as or otherwise support a means for determining a weighting factor for each TTI within the threshold number of TTIs, the weighting factors each based on a SPEF of channel communications between the base station and the UE. The weighting factor summation component 635 may be configured as or otherwise support a means for summing at least a subset of the weighting factors in order to identify a transition determination value. The state transition component 640 may be configured as or otherwise support a means for transitioning from the first receive state to a second receive state of the set of multiple receive states based on the transition determination value.

Figure 7:
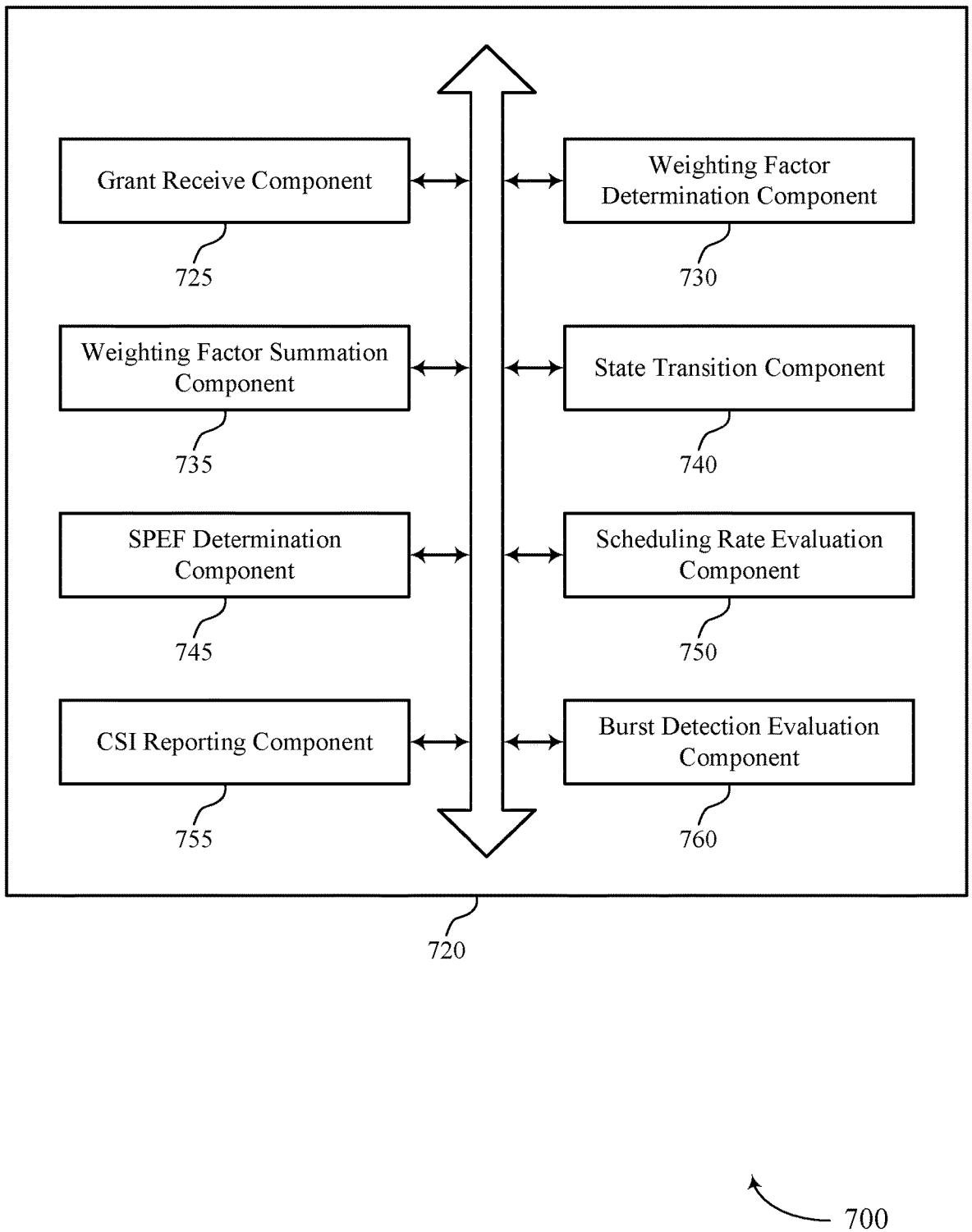
FIG. 7 shows a block diagram of a communications manager that supports advanced adaptive receivers based on SPEF utilization in accordance with aspects of the present disclosure.

FIG. 7 shows a block diagram 700 of a communications manager 720 that supports advanced adaptive receivers based on SPEF utilization in accordance with aspects of the present disclosure. The communications manager 720 may be an example of aspects of a communications manager 520, a communications manager 620, or both, as described herein. The communications manager 720, or various components thereof, may be an example of means for performing various aspects of advanced adaptive receivers based on SPEF utilization as described herein. For example, the communications manager 720 may include a grant receive component 725, a weighting factor determination component 730, a weighting factor summation component 735, a state transition component 740, an SPEF determination component 745, a scheduling rate evaluation component 750, a CSI reporting component 755, a burst detection evaluation component 760, or any combination thereof. Each of these components may communicate, directly or indirectly, with one another (e.g., via one or more buses).

The communications manager 720 may support wireless communications at a UE in accordance with examples as disclosed herein. The grant receive component 725 may be configured as or otherwise support a means for receiving, from a base station and within a threshold number of TTIs, one or more downlink grants while operating in accordance with a first receive state of a set of multiple receive states at the UE. The weighting factor determination component 730 may be configured as or otherwise support a means for determining a weighting factor for each TTI within the threshold number of TTIs, the weighting factors each based on a SPEF of channel communications between the base station and the UE. The weighting factor summation component 735 may be configured as or otherwise support a means for summing at least a subset of the weighting factors in order to identify a transition determination value. The state transition component 740 may be configured as or otherwise support a means for transitioning from the first receive state to a second receive state of the set of multiple receive states based on the transition determination value.

In some examples, the SPEF determination component 745 may be configured as or otherwise support a means for determining the SPEF of channel communications between the base station and the UE for each TTI based on a ratio between a first SPEF associated with scheduled information bits per resource element scheduled by the base station and a second SPEF associated with a number of information bits per resource element the UE is capable of decoding.

In some examples, the SPEF determination component 745 may be configured as or otherwise support a means for determining the first SPEF by summing one or more SPEF values for one or more respective code words of a downlink grant, each of the one or more SPEF values being a product of a number of layers associated with the downlink grant, a code rate, and a modulation order for individual ones of the one or more respective code words.

In some examples, the SPEF determination component 745 may be configured as or otherwise support a means for determining the second SPEF by estimating, at the UE, a capability to decode the number of information bits per resource element.

In some examples, the CSI reporting component 755 may be configured as or otherwise support a means for transmitting, to the base station, a channel state information report based on a mapping between the second SPEF and a rank indication, a channel quality index, or both.

In some examples, to support summing at least the subset of the weighting factors in order to identify the transition determination value, the weighting factor summation component 735 may be configured as or otherwise support a means for summing individual weighting factors that correspond to individual TTIs of the threshold number of TTIs that have at least one of the one or more downlink grants.

In some examples, the transition determination value includes a burst detection transition determination value based on the summing of at least the subset of the weighting factors in accordance with a burst detection function, and the state transition component 740 may be configured as or otherwise support a means for determining whether to transition from the first receive state to the second receive state based on the burst detection transition determination value, where the first receive state includes a receive disallowed state and the second receive state includes a receive standby state.

In some examples, the burst detection evaluation component 760 may be configured as or otherwise support a means for comparing the burst detection transition determination value to a threshold burst detection transition determination value. In some examples, the state transition component 740 may be configured as or otherwise support a means for determining whether to transition from the first receive state to the second receive state based on the comparing.

In some examples, the state transition component 740 may be configured as or otherwise support a means for determining to transition from the first receive state to the second receive state based on the burst detection transition determination value exceeding the threshold burst detection transition determination value.

In some examples, the threshold burst detection transition determination value is configured based on long-term downlink traffic statistics, short-term downlink traffic statistics, or both.

In some examples, the transition determination value includes a scheduling rate transition determination value based on the summing of at least the subset of the weighting factors in accordance with a scheduling rate function, and the scheduling rate evaluation component 750 may be configured as or otherwise support a means for determining whether to transition from the first receive state to the second receive state based on the scheduling rate transition determination value, where the first receive state includes a receive standby and the second receive state includes a receive disallowed state.

In some examples, the scheduling rate evaluation component 750 may be configured as or otherwise support a means for comparing the transition determination value to a threshold scheduling rate transition determination value. In some examples, the state transition component 740 may be configured as or otherwise support a means for determining whether to transition from the first receive state to the second receive state based on the comparing.

In some examples, the state transition component 740 may be configured as or otherwise support a means for determining to transition from the first receive state to the second receive state based on the scheduling rate transition determination value exceeding the threshold scheduling rate transition determination value.

In some examples, the threshold scheduling rate transition determination value is configured based on long-term downlink traffic statistics, short-term downlink traffic statistics, or both.

In some examples, the first receive state is associated with a first number of receive antennas and the second receive state is associated with a second number of receive antennas different than the first number of receive antennas.

In some examples, the weighting factor is a function of a subframe index of the one or more downlink grants.

In some examples, the one or more downlink grants include one-layer grants, two-layer grants, or a combination thereof.

Figure 8:
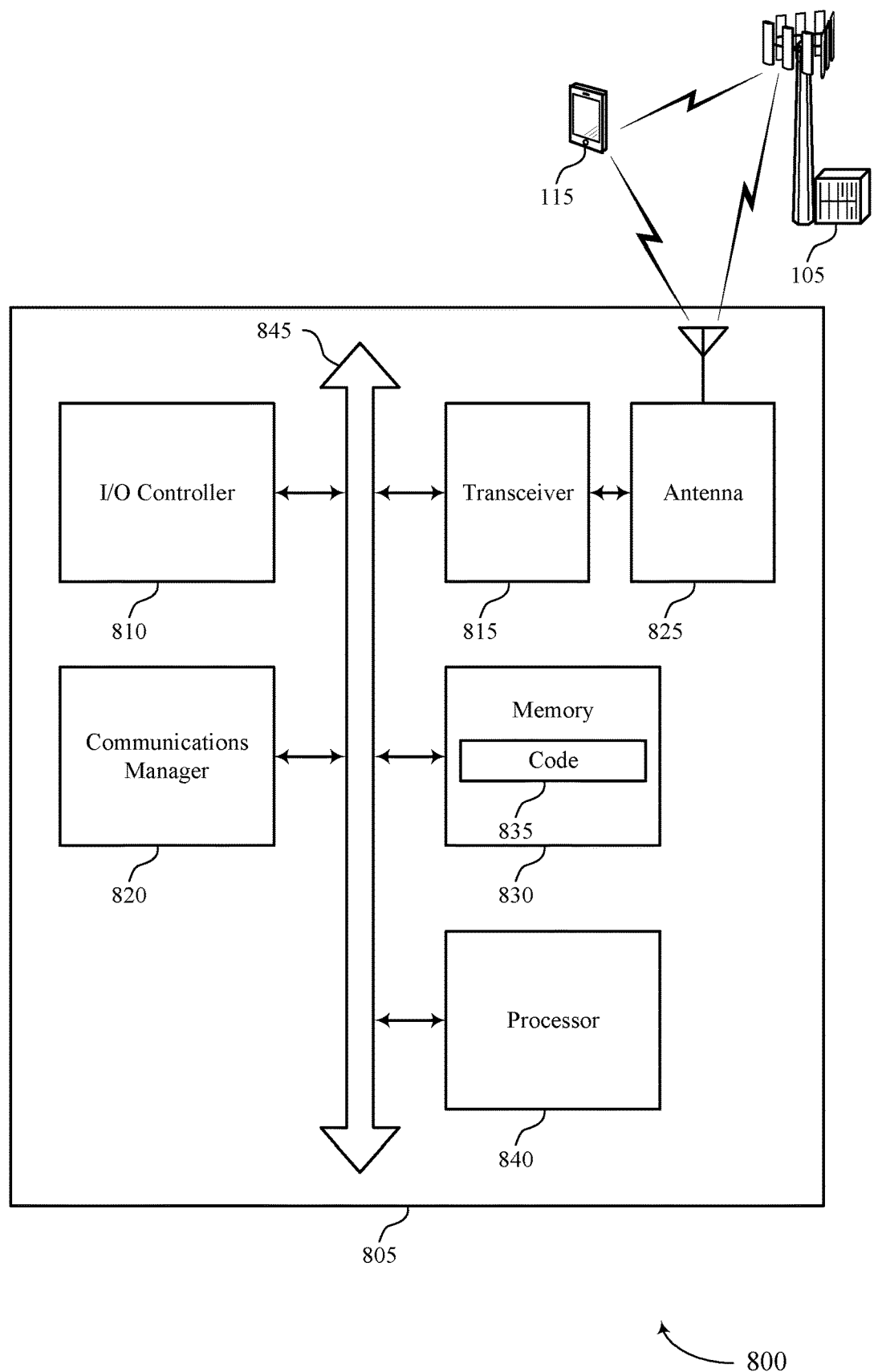
FIG. 8 shows a diagram of a system including a device that supports advanced adaptive receivers based on SPEF utilization in accordance with aspects of the present disclosure.

FIG. 8 shows a diagram of a system 800 including a device 805 that supports advanced adaptive receivers based on SPEF utilization in accordance with aspects of the present disclosure. The device 805 may be an example of or include the components of a device 505, a device 605, or a UE 115 as described herein. The device 805 may communicate wirelessly with one or more base stations 105, UEs 115, or any combination thereof. The device 805 may include components for bi-directional voice and data communications including components for transmitting and receiving communications, such as a communications manager 820, an input/output (I/O) controller 810, a transceiver 815, an antenna 825, a memory 830, code 835, and a processor 840. These components may be in electronic communication or otherwise coupled (e.g., operatively, communicatively, functionally, electronically, electrically) via one or more buses (e.g., a bus 845).

The I/O controller 810 may manage input and output signals for the device 805. The I/O controller 810 may also manage peripherals not integrated into the device 805. In some cases, the I/O controller 810 may represent a physical connection or port to an external peripheral. In some cases, the I/O controller 810 may utilize an operating system such as iOS®, ANDROID®, MS-DOS®, MS-WINDOWS®, OS/2®, UNIX®, LINUX®, or another known operating system. Additionally or alternatively, the I/O controller 810 may represent or interact with a modem, a keyboard, a mouse, a touchscreen, or a similar device. In some cases, the I/O controller 810 may be implemented as part of a processor, such as the processor 840. In some cases, a user may interact with the device 805 via the I/O controller 810 or via hardware components controlled by the I/O controller 810.

In some cases, the device 805 may include a single antenna 825. However, in some other cases, the device 805 may have more than one antenna 825, which may be capable of concurrently transmitting or receiving multiple wireless transmissions. The transceiver 815 may communicate bi-directionally, via the one or more antennas 825, wired, or wireless links as described herein. For example, the transceiver 815 may represent a wireless transceiver and may communicate bi-directionally with another wireless transceiver. The transceiver 815 may also include a modem to modulate the packets, to provide the modulated packets to one or more antennas 825 for transmission, and to demodulate packets received from the one or more antennas 825. The transceiver 815, or the transceiver 815 and one or more antennas 825, may be an example of a transmitter 515, a transmitter 615, a receiver 510, a receiver 610, or any combination thereof or component thereof, as described herein.

The memory 830 may include random access memory (RAM) and read-only memory (ROM). The memory 830 may store computer-readable, computer-executable code 835 including instructions that, when executed by the processor 840, cause the device 805 to perform various functions described herein. The code 835 may be stored in a non-transitory computer-readable medium such as system memory or another type of memory. In some cases, the code 835 may not be directly executable by the processor 840 but may cause a computer (e.g., when compiled and executed) to perform functions described herein. In some cases, the memory 830 may contain, among other things, a basic I/O system (BIOS) which may control basic hardware or software operation such as the interaction with peripheral components or devices.

The processor 840 may include an intelligent hardware device (e.g., a general-purpose processor, a DSP, a CPU, a microcontroller, an ASIC, an FPGA, a programmable logic device, a discrete gate or transistor logic component, a discrete hardware component, or any combination thereof). In some cases, the processor 840 may be configured to operate a memory array using a memory controller. In some other cases, a memory controller may be integrated into the processor 840. The processor 840 may be configured to execute computer-readable instructions stored in a memory (e.g., the memory 830) to cause the device 805 to perform various functions (e.g., functions or tasks supporting advanced adaptive receivers based on SPEF utilization). For example, the device 805 or a component of the device 805 may include a processor 840 and memory 830 coupled to the processor 840, the processor 840 and memory 830 configured to perform various functions described herein.

The communications manager 820 may support wireless communications at a UE in accordance with examples as disclosed herein. For example, the communications manager 820 may be configured as or otherwise support a means for receiving, from a base station and within a threshold number of TTIs, one or more downlink grants while operating in accordance with a first receive state of a set of multiple receive states at the UE. The communications manager 820 may be configured as or otherwise support a means for determining a weighting factor for each TTI within the threshold number of TTIs, the weighting factors each based on a SPEF of channel communications between the base station and the UE. The communications manager 820 may be configured as or otherwise support a means for summing at least a subset of the weighting factors in order to identify a transition determination value. The communications manager 820 may be configured as or otherwise support a means for transitioning from the first receive state to a second receive state of the set of multiple receive states based on the transition determination value.

By including or configuring the communications manager 820 in accordance with examples as described herein, the device 805 may support techniques for improved communication reliability, reduced latency, reduced power consumption, more efficient utilization of communication resources, improved coordination between devices, longer battery life, and improved utilization of processing capability.

In some examples, the communications manager 820 may be configured to perform various operations (e.g., receiving, monitoring, transmitting) using or otherwise in cooperation with the transceiver 815, the one or more antennas 825, or any combination thereof. Although the communications manager 820 is illustrated as a separate component, in some examples, one or more functions described with reference to the communications manager 820 may be supported by or performed by the processor 840, the memory 830, the code 835, or any combination thereof. For example, the code 835 may include instructions executable by the processor 840 to cause the device 805 to perform various aspects of advanced adaptive receivers based on SPEF utilization as described herein, or the processor 840 and the memory 830 may be otherwise configured to perform or support such operations.

Figure 9:
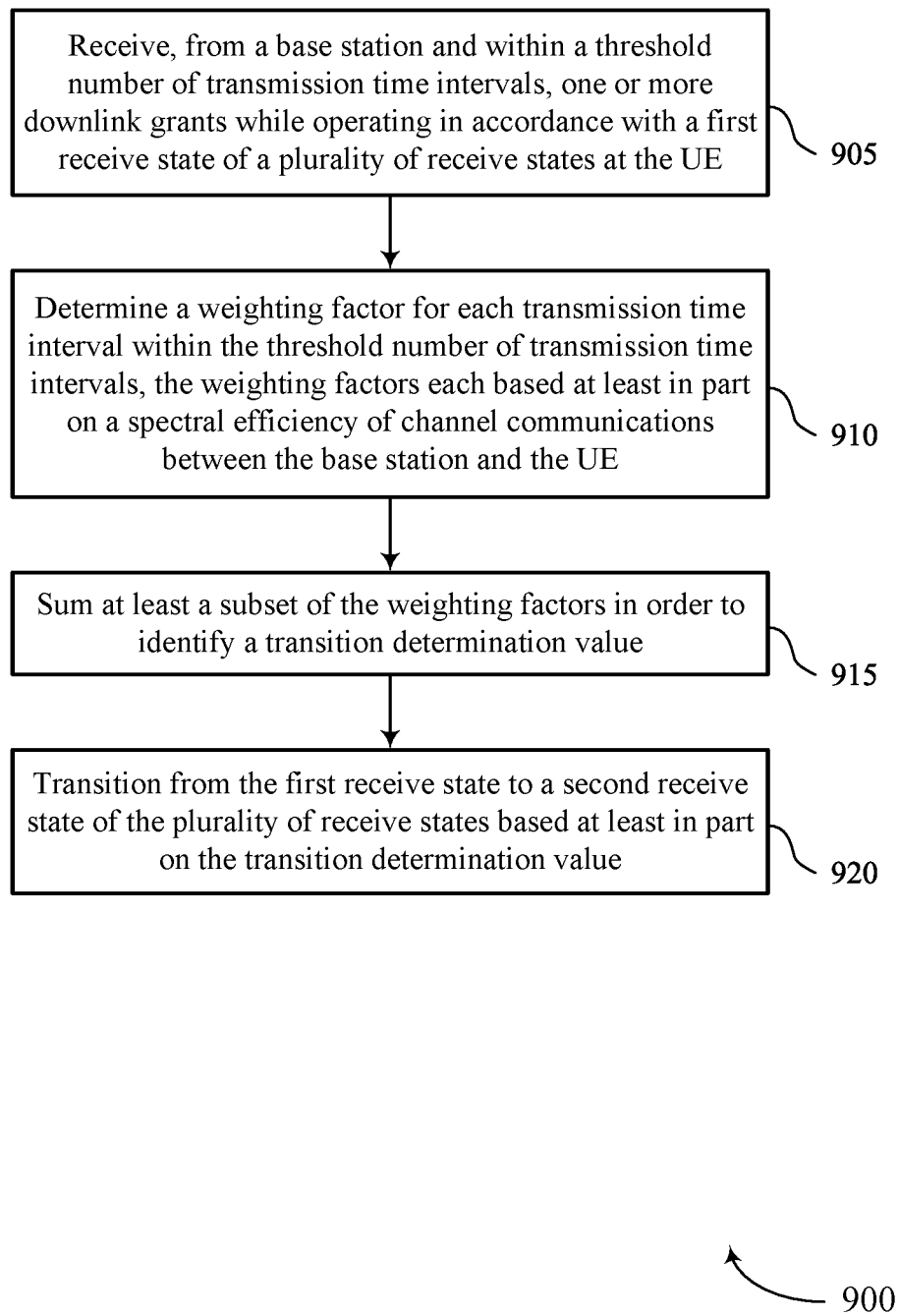
FIGS. 9 through 13 show flowcharts illustrating methods that support advanced adaptive receivers based on SPEF utilization in accordance with aspects of the present disclosure.

FIG. 9 shows a flowchart illustrating a method 900 that supports advanced adaptive receivers based on SPEF utilization in accordance with aspects of the present disclosure. The operations of the method 900 may be implemented by a UE or its components as described herein. For example, the operations of the method 900 may be performed by a UE 115 as described with reference to FIGS. 1 through 8. In some examples, a UE may execute a set of instructions to control the functional elements of the UE to perform the described functions. Additionally or alternatively, the UE may perform aspects of the described functions using special-purpose hardware.

At 905, the method may include receiving, from a base station and within a threshold number of TTIs, one or more downlink grants while operating in accordance with a first receive state of a set of multiple receive states at the UE. The operations of 905 may be performed in accordance with examples as disclosed herein. In some examples, aspects of the operations of 905 may be performed by a grant receive component 725 as described with reference to FIG. 7.

At 910, the method may include determining a weighting factor for each TTI within the threshold number of TTIs, the weighting factors each based on a SPEF of channel communications between the base station and the UE. The operations of 910 may be performed in accordance with examples as disclosed herein. In some examples, aspects of the operations of 910 may be performed by a weighting factor determination component 730 as described with reference to FIG. 7.

At 915, the method may include summing at least a subset of the weighting factors in order to identify a transition determination value. The operations of 915 may be performed in accordance with examples as disclosed herein. In some examples, aspects of the operations of 915 may be performed by a weighting factor summation component 735 as described with reference to FIG. 7.

At 920, the method may include transitioning from the first receive state to a second receive state of the set of multiple receive states based on the transition determination value. The operations of 920 may be performed in accordance with examples as disclosed herein. In some examples, aspects of the operations of 920 may be performed by a state transition component 740 as described with reference to FIG. 7.

Figure 10:
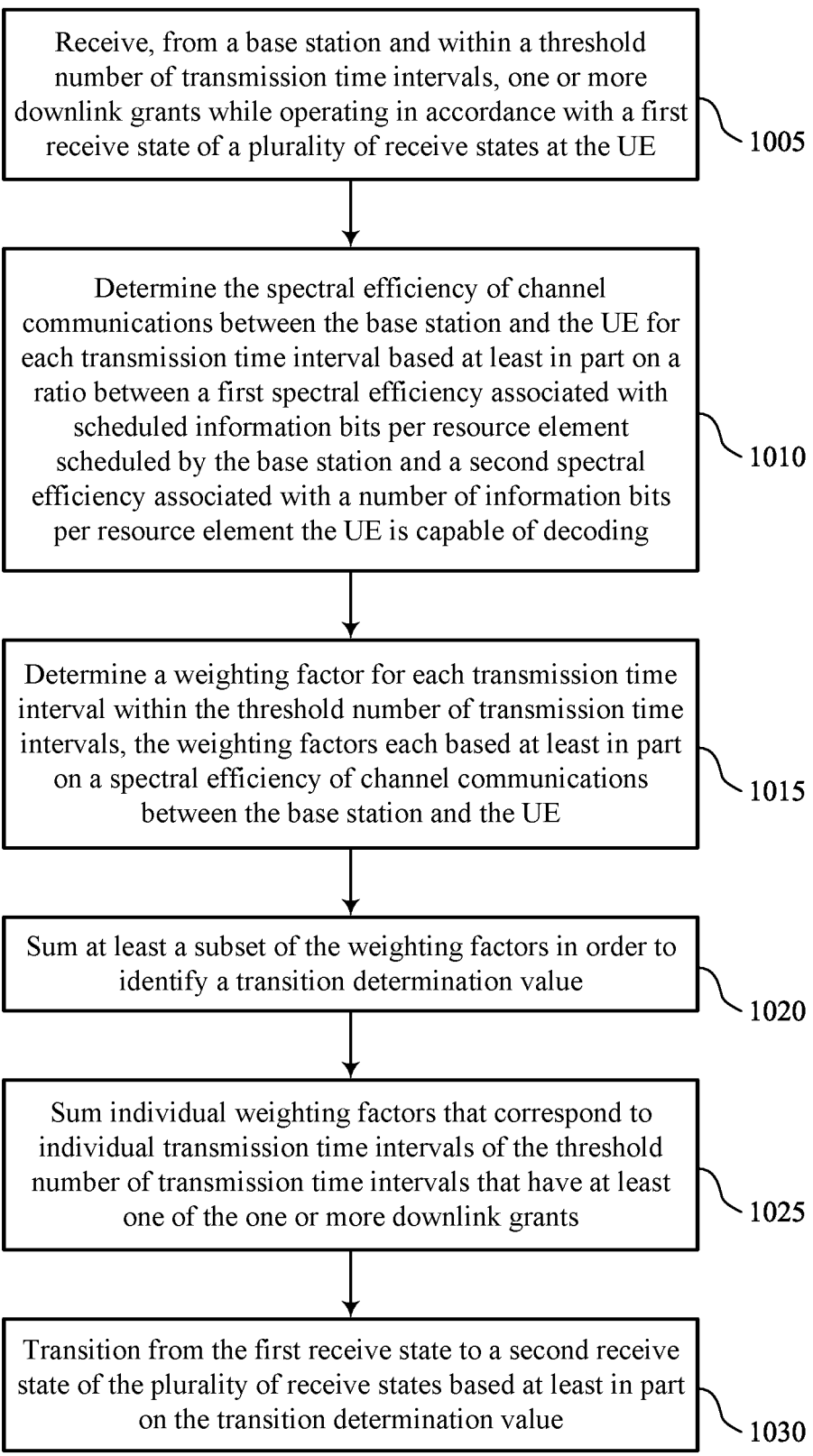

FIG. 10 shows a flowchart illustrating a method 1000 that supports advanced adaptive receivers based on SPEF utilization in accordance with aspects of the present disclosure. The operations of the method 1000 may be implemented by a UE or its components as described herein. For example, the operations of the method 100 may be performed by a UE 115 as described with reference to FIGS. 1 through 8. In some examples, a UE may execute a set of instructions to control the functional elements of the UE to perform the described functions. Additionally or alternatively, the UE may perform aspects of the described functions using special-purpose hardware.

At 1005, the method may include receiving, from a base station and within a threshold number of TTIs, one or more downlink grants while operating in accordance with a first receive state of a set of multiple receive states at the UE. The operations of 1005 may be performed in accordance with examples as disclosed herein. In some examples, aspects of the operations of 1005 may be performed by a grant receive component 725 as described with reference to FIG. 7.

At 1010, the method may include determining the SPEF of channel communications between the base station and the UE for each TTI based on a ratio between a first SPEF associated with scheduled information bits per resource element scheduled by the base station and a second SPEF associated with a number of information bits per resource element the UE is capable of decoding. The operations of 1010 may be performed in accordance with examples as disclosed herein. In some examples, aspects of the operations of 1010 may be performed by an SPEF determination component 745 as described with reference to FIG. 7.

At 1015, the method may include determining a weighting factor for each TTI within the threshold number of TTIs, the weighting factors each based on a SPEF of channel communications between the base station and the UE. The operations of 1015 may be performed in accordance with examples as disclosed herein. In some examples, aspects of the operations of 1015 may be performed by a weighting factor determination component 730 as described with reference to FIG. 7.

At 1020, the method may include summing at least a subset of the weighting factors in order to identify a transition determination value. The operations of 1020 may be performed in accordance with examples as disclosed herein. In some examples, aspects of the operations of 1020 may be performed by a weighting factor summation component 735 as described with reference to FIG. 7.

At 1025, the method may include summing individual weighting factors that correspond to individual TTIs of the threshold number of TTIs that have at least one of the one or more downlink grants. The operations of 1025 may be performed in accordance with examples as disclosed herein. In some examples, aspects of the operations of 1025 may be performed by a weighting factor summation component 735 as described with reference to FIG. 7.

At 1030, the method may include transitioning from the first receive state to a second receive state of the set of multiple receive states based on the transition determination value. The operations of 1030 may be performed in accordance with examples as disclosed herein. In some examples, aspects of the operations of 1030 may be performed by a state transition component 740 as described with reference to FIG. 7.

Figure 11:
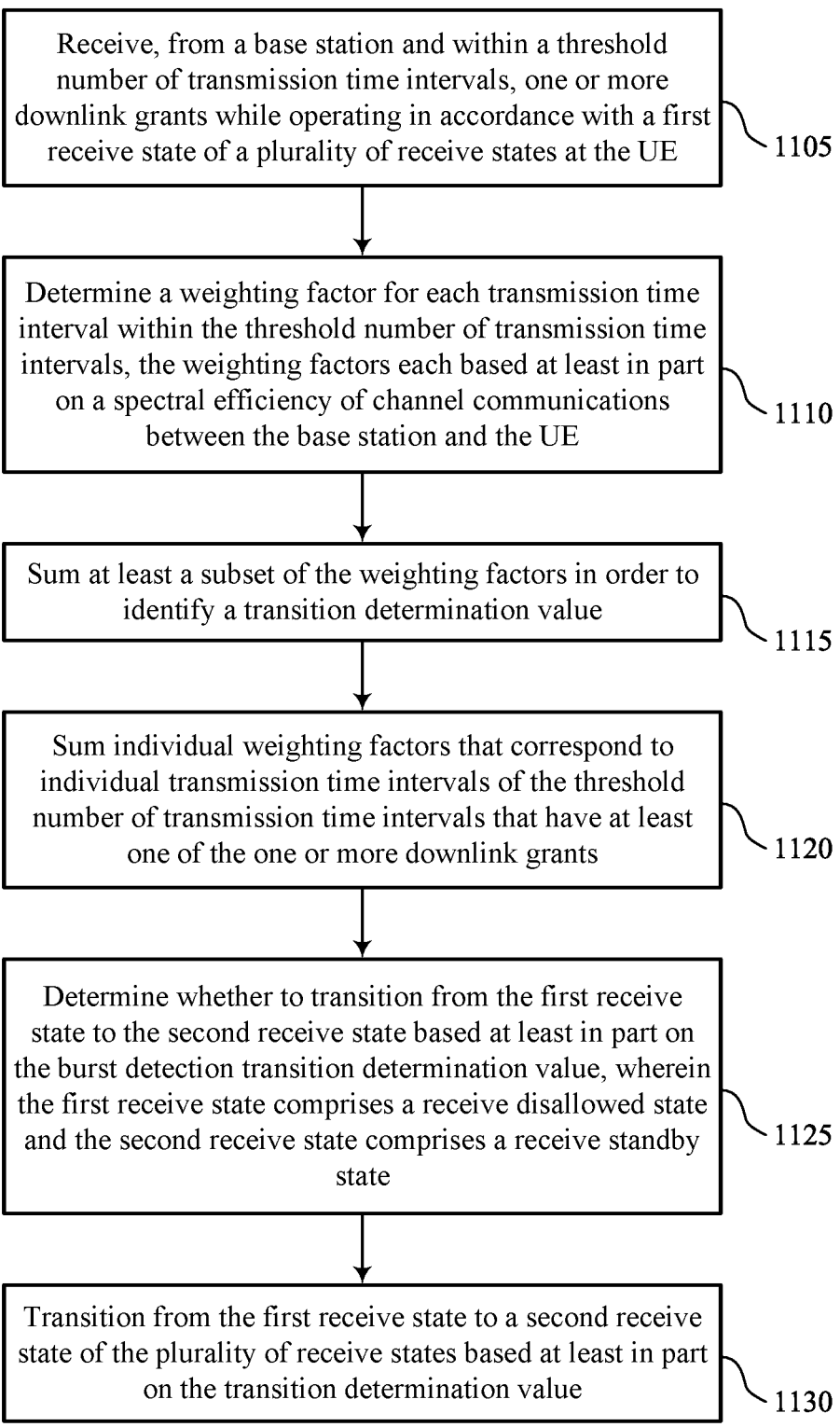

FIG. 11 shows a flowchart illustrating a method 1100 that supports advanced adaptive receivers based on SPEF utilization in accordance with aspects of the present disclosure. The operations of the method 1100 may be implemented by a UE or its components as described herein. For example, the operations of the method 1100 may be performed by a UE 115 as described with reference to FIGS. 1 through 8. In some examples, a UE may execute a set of instructions to control the functional elements of the UE to perform the described functions. Additionally or alternatively, the UE may perform aspects of the described functions using special-purpose hardware.

At 1105, the method may include receiving, from a base station and within a threshold number of TTIs, one or more downlink grants while operating in accordance with a first receive state of a set of multiple receive states at the UE. The operations of 1105 may be performed in accordance with examples as disclosed herein. In some examples, aspects of the operations of 1105 may be performed by a grant receive component 725 as described with reference to FIG. 7.

At 1110, the method may include determining a weighting factor for each TTI within the threshold number of TTIs, the weighting factors each based on a SPEF of channel communications between the base station and the UE. The operations of 1110 may be performed in accordance with examples as disclosed herein. In some examples, aspects of the operations of 1110 may be performed by a weighting factor determination component 730 as described with reference to FIG. 7.

At 1115, the method may include summing at least a subset of the weighting factors in order to identify a transition determination value. The operations of 1115 may be performed in accordance with examples as disclosed herein. In some examples, aspects of the operations of 1115 may be performed by a weighting factor summation component 735 as described with reference to FIG. 7.

At 1120, the method may include summing individual weighting factors that correspond to individual TTIs of the threshold number of TTIs that have at least one of the one or more downlink grants. The operations of 1120 may be performed in accordance with examples as disclosed herein. In some examples, aspects of the operations of 1120 may be performed by a weighting factor summation component 735 as described with reference to FIG. 7.

At 1125, the method may include determining whether to transition from the first receive state to the second receive state based on the burst detection transition determination value, where the first receive state includes a receive disallowed state and the second receive state includes a receive standby state. The operations of 1125 may be performed in accordance with examples as disclosed herein. In some examples, aspects of the operations of 1125 may be performed by a state transition component 740 as described with reference to FIG. 7.

At 1130, the method may include transitioning from the first receive state to a second receive state of the set of multiple receive states based on the transition determination value. The operations of 1130 may be performed in accordance with examples as disclosed herein. In some examples, aspects of the operations of 1130 may be performed by a state transition component 740 as described with reference to FIG. 7.

Figure 12:
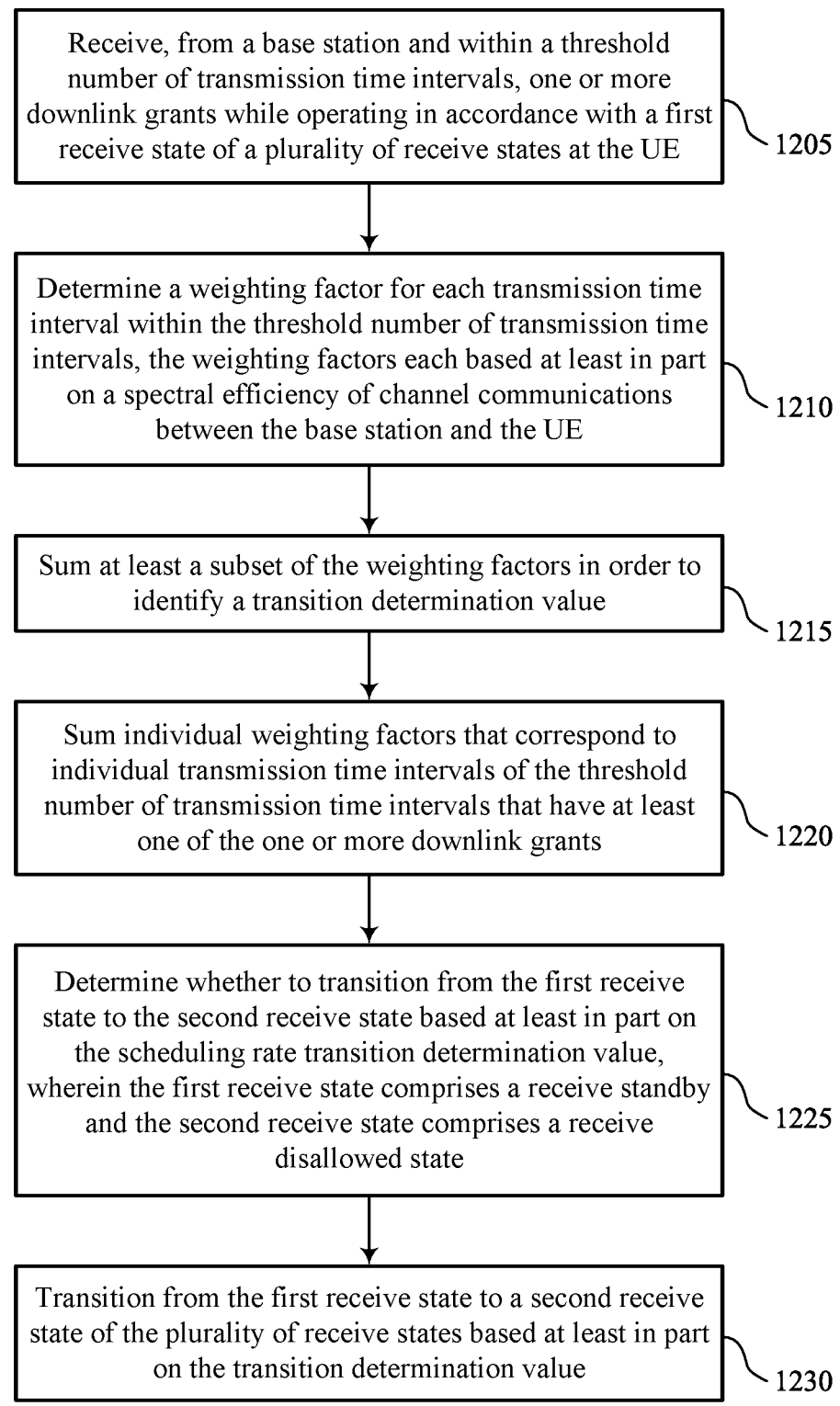

FIG. 12 shows a flowchart illustrating a method 1200 that supports advanced adaptive receivers based on SPEF utilization in accordance with aspects of the present disclosure. The operations of the method 1200 may be implemented by a UE or its components as described herein. For example, the operations of the method 1200 may be performed by a UE 115 as described with reference to FIGS. 1 through 8. In some examples, a UE may execute a set of instructions to control the functional elements of the UE to perform the described functions. Additionally or alternatively, the UE may perform aspects of the described functions using special-purpose hardware.

At 1205, the method may include receiving, from a base station and within a threshold number of TTIs, one or more downlink grants while operating in accordance with a first receive state of a set of multiple receive states at the UE. The operations of 1205 may be performed in accordance with examples as disclosed herein. In some examples, aspects of the operations of 1205 may be performed by a grant receive component 725 as described with reference to FIG. 7.

At 1210, the method may include determining a weighting factor for each TTI within the threshold number of TTIs, the weighting factors each based on a SPEF of channel communications between the base station and the UE. The operations of 1210 may be performed in accordance with examples as disclosed herein. In some examples, aspects of the operations of 1210 may be performed by a weighting factor determination component 730 as described with reference to FIG. 7.

At 1215, the method may include summing at least a subset of the weighting factors in order to identify a transition determination value. The operations of 1215 may be performed in accordance with examples as disclosed herein. In some examples, aspects of the operations of 1215 may be performed by a weighting factor summation component 735 as described with reference to FIG. 7.

At 1220, the method may include summing individual weighting factors that correspond to individual TTIs of the threshold number of TTIs that have at least one of the one or more downlink grants. The operations of 1220 may be performed in accordance with examples as disclosed herein. In some examples, aspects of the operations of 1220 may be performed by a weighting factor summation component 735 as described with reference to FIG. 7.

At 1225, the method may include determining whether to transition from the first receive state to the second receive state based on the scheduling rate transition determination value, where the first receive state includes a receive standby and the second receive state includes a receive disallowed state. The operations of 1225 may be performed in accordance with examples as disclosed herein. In some examples, aspects of the operations of 1225 may be performed by a scheduling rate evaluation component 750 as described with reference to FIG. 7.

At 1230, the method may include transitioning from the first receive state to a second receive state of the set of multiple receive states based on the transition determination value. The operations of 1230 may be performed in accordance with examples as disclosed herein. In some examples, aspects of the operations of 1230 may be performed by a state transition component 740 as described with reference to FIG. 7.

Figure 13:
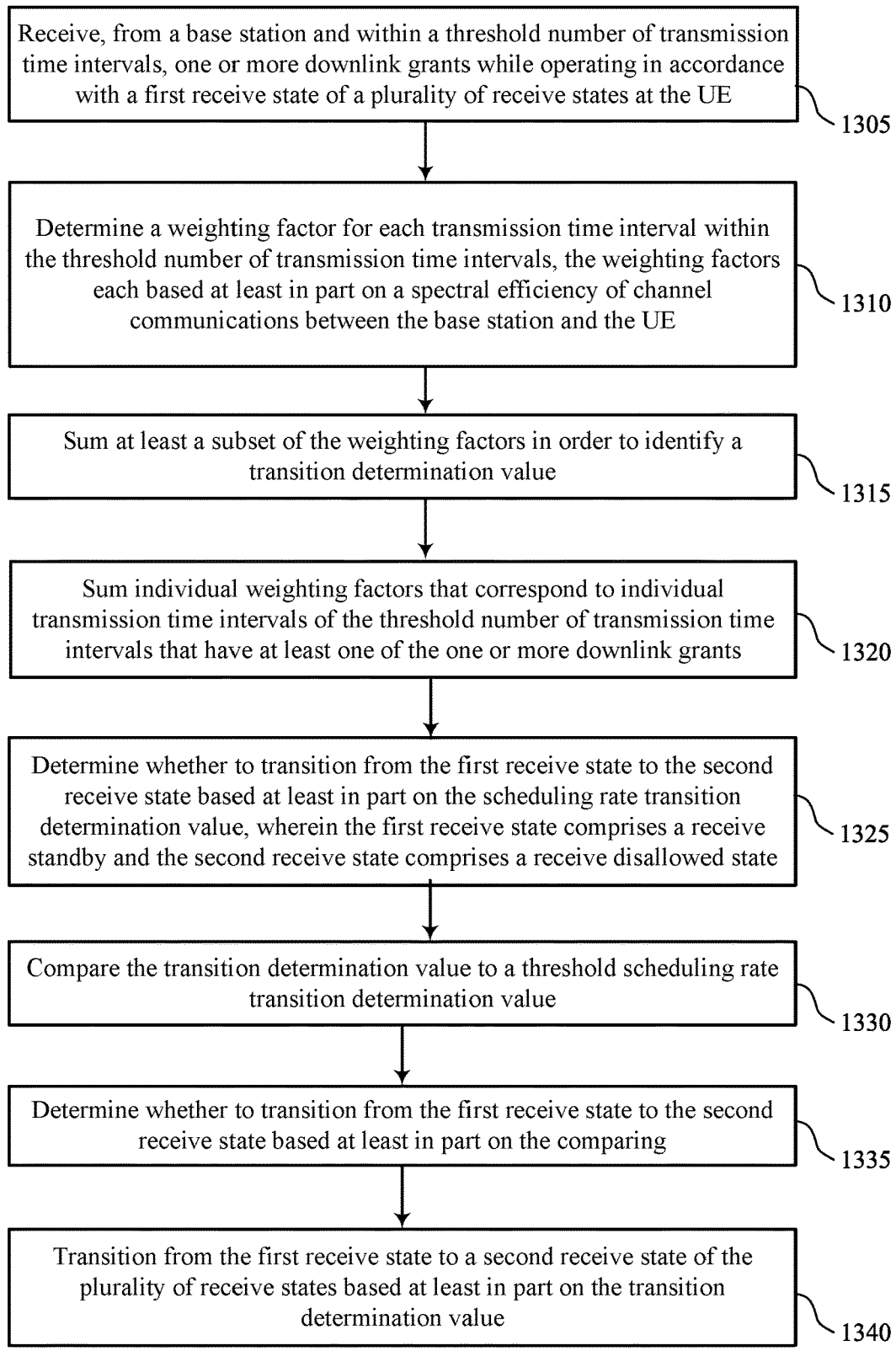

FIG. 13 shows a flowchart illustrating a method 1300 that supports advanced adaptive receivers based on SPEF utilization in accordance with aspects of the present disclosure. The operations of the method 1300 may be implemented by a UE or its components as described herein. For example, the operations of the method 1300 may be performed by a UE 115 as described with reference to FIGS. 1 through 8. In some examples, a UE may execute a set of instructions to control the functional elements of the UE to perform the described functions. Additionally or alternatively, the UE may perform aspects of the described functions using special-purpose hardware.

At 1305, the method may include receiving, from a base station and within a threshold number of TTIs, one or more downlink grants while operating in accordance with a first receive state of a set of multiple receive states at the UE. The operations of 1305 may be performed in accordance with examples as disclosed herein. In some examples, aspects of the operations of 1305 may be performed by a grant receive component 725 as described with reference to FIG. 7.

At 1310, the method may include determining a weighting factor for each TTI within the threshold number of TTIs, the weighting factors each based on a SPEF of channel communications between the base station and the UE. The operations of 1310 may be performed in accordance with examples as disclosed herein. In some examples, aspects of the operations of 1310 may be performed by a weighting factor determination component 730 as described with reference to FIG. 7.

At 1315, the method may include summing at least a subset of the weighting factors in order to identify a transition determination value. The operations of 1315 may be performed in accordance with examples as disclosed herein. In some examples, aspects of the operations of 1315 may be performed by a weighting factor summation component 735 as described with reference to FIG. 7.

At 1320, the method may include summing individual weighting factors that correspond to individual TTIs of the threshold number of TTIs that have at least one of the one or more downlink grants. The operations of 1320 may be performed in accordance with examples as disclosed herein.

In some examples, aspects of the operations of 1320 may be performed by a weighting factor summation component 735 as described with reference to FIG. 7.

At 1325, the method may include determining whether to transition from the first receive state to the second receive state based on the scheduling rate transition determination value, where the first receive state includes a receive standby and the second receive state includes a receive disallowed state. The operations of 1325 may be performed in accordance with examples as disclosed herein. In some examples, aspects of the operations of 1325 may be performed by a scheduling rate evaluation component 750 as described with reference to FIG. 7.

At 1330, the method may include comparing the transition determination value to a threshold scheduling rate transition determination value. The operations of 1330 may be performed in accordance with examples as disclosed herein. In some examples, aspects of the operations of 1330 may be performed by a scheduling rate evaluation component 750 as described with reference to FIG. 7.

At 1335, the method may include determining whether to transition from the first receive state to the second receive state based on the comparing. The operations of 1335 may be performed in accordance with examples as disclosed herein. In some examples, aspects of the operations of 1335 may be performed by a state transition component 740 as described with reference to FIG. 7.

At 1340, the method may include transitioning from the first receive state to a second receive state of the set of multiple receive states based on the transition determination value. The operations of 1340 may be performed in accordance with examples as disclosed herein. In some examples, aspects of the operations of 1340 may be performed by a state transition component 740 as described with reference to FIG. 7.

The following provides an overview of aspects of the present disclosure:

Aspect 1: A method for wireless communications at a UE, comprising: receiving, from a base station and within a threshold number of TTIs, one or more downlink grants while operating in accordance with a first receive state of a plurality of receive states at the UE; determining a weighting factor for each TTI within the threshold number of TTIs, the weighting factors each based at least in part on a spectral efficiency of channel communications between the base station and the UE; summing at least a subset of the weighting factors in order to identify a transition determination value; and transitioning from the first receive state to a second receive state of the plurality of receive states based at least in part on the transition determination value.

Aspect 2: The method of aspect 1, further comprising: determining the spectral efficiency of channel communications between the base station and the UE for each TTI based at least in part on a ratio between a first spectral efficiency associated with scheduled information bits per resource element scheduled by the base station and a second spectral efficiency associated with a number of information bits per resource element the UE is capable of decoding.

Aspect 3: The method of aspect 2, further comprising: determining the first spectral efficiency by summing one or more spectral efficiency values for one or more respective code words of a downlink grant, each of the one or more spectral efficiency values being a product of a number of layers associated with the downlink grant, a code rate, and a modulation order for individual ones of the one or more respective code words.

Aspect 4: The method of any of aspects 2 through 3, further comprising: determining the second spectral efficiency by estimating, at the UE, a capability to decode the number of information bits per resource element.

Aspect 5: The method of aspect 4, further comprising: transmitting, to the base station, a channel state information report based at least in part on a mapping between the second spectral efficiency and a rank indication, a channel quality index, or both.

Aspect 6: The method of any of aspects 1 through 5, wherein summing at least the subset of the weighting factors in order to identify the transition determination value further comprises: summing individual weighting factors that correspond to individual TTIs of the threshold number of TTIs that have at least one of the one or more downlink grants.

Aspect 7: The method of aspect 6, wherein the transition determination value comprises a burst detection transition determination value based at least in part on the summing of at least the subset of the weighting factors in accordance with a burst detection function, the method further comprising: determining whether to transition from the first receive state to the second receive state based at least in part on the burst detection transition determination value, wherein the first receive state comprises a receive disallowed state and the second receive state comprises a receive standby state.

Aspect 8: The method of aspect 7, further comprising: comparing the burst detection transition determination value to a threshold burst detection transition determination value; and determining whether to transition from the first receive state to the second receive state based at least in part on the comparing.

Aspect 9: The method of aspect 8, further comprising: determining to transition from the first receive state to the second receive state based at least in part on the burst detection transition determination value exceeding the threshold burst detection transition determination value.

Aspect 10: The method of any of aspects 8 through 9, wherein the threshold burst detection transition determination value is configured based at least in part on long-term downlink traffic statistics, short-term downlink traffic statistics, or both.

Aspect 11: The method of any of aspects 6 through 10, wherein the transition determination value comprises a scheduling rate transition determination value based at least in part on the summing of at least the subset of the weighting factors in accordance with a scheduling rate function, the method further comprising: determining whether to transition from the first receive state to the second receive state based at least in part on the scheduling rate transition determination value, wherein the first receive state comprises a receive standby and the second receive state comprises a receive disallowed state.

Aspect 12: The method of aspect 11, further comprising: comparing the transition determination value to a threshold scheduling rate transition determination value; and determining whether to transition from the first receive state to the second receive state based at least in part on the comparing.

Aspect 13: The method of aspect 12, further comprising: determining to transition from the first receive state to the second receive state based at least in part on the scheduling rate transition determination value exceeding the threshold scheduling rate transition determination value.

Aspect 14: The method of any of aspects 12 through 13, wherein the threshold scheduling rate transition determination value is configured based at least in part on long-term downlink traffic statistics, short-term downlink traffic statistics, or both.

Aspect 15: The method of any of aspects 1 through 14, wherein the first receive state is associated with a first number of receive antennas and the second receive state is associated with a second number of receive antennas different than the first number of receive antennas.

Aspect 16: The method of any of aspects 1 through 15, wherein the weighting factor is a function of a subframe index of the one or more downlink grants.

Aspect 17: The method of any of aspects 1 through 16, wherein the one or more downlink grants comprise one-layer grants, two-layer grants, or a combination thereof.

Aspect 18: An apparatus for wireless communications at a UE, comprising a processor; memory coupled with the processor; and instructions stored in the memory and executable by the processor to cause the apparatus to perform a method of any of aspects 1 through 17.

Aspect 19: An apparatus for wireless communications at a UE, comprising at least one means for performing a method of any of aspects 1 through 17.

Aspect 20: A non-transitory computer-readable medium storing code for wireless communications at a UE, the code comprising instructions executable by a processor to perform a method of any of aspects 1 through 17.

It should be noted that the methods described herein describe possible implementations, and that the operations and the steps may be rearranged or otherwise modified and that other implementations are possible. Further, aspects from two or more of the methods may be combined.

Although aspects of an LTE, LTE-A, LTE-A Pro, or NR system may be described for purposes of example, and LTE, LTE-A, LTE-A Pro, or NR terminology may be used in much of the description, the techniques described herein are applicable beyond LTE, LTE-A, LTE-A Pro, or NR networks. For example, the described techniques may be applicable to various other wireless communications systems such as Ultra Mobile Broadband (UMB), Institute of Electrical and Electronics Engineers (IEEE) 802.11 (Wi-Fi), IEEE 802.16 (WiMAX), IEEE 802.20, Flash-OFDM, as well as other systems and radio technologies not explicitly mentioned herein.

Information and signals described herein may be represented using any of a variety of different technologies and techniques. For example, data, instructions, commands, information, signals, bits, symbols, and chips that may be referenced throughout the description may be represented by voltages, currents, electromagnetic waves, magnetic fields or particles, optical fields or particles, or any combination thereof.

The various illustrative blocks and components described in connection with the disclosure herein may be implemented or performed with a general-purpose processor, a DSP, an ASIC, a CPU, an FPGA or other programmable logic device, discrete gate or transistor logic, discrete hardware components, or any combination thereof designed to perform the functions described herein. A general-purpose processor may be a microprocessor, but in the alternative, the processor may be any processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration).

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope of the disclosure and appended claims. For example, due to the nature of software, functions described herein may be implemented using software executed by a processor, hardware, firmware, hardwiring, or combinations of any of these. Features implementing functions may also be physically located at various positions, including being distributed such that portions of functions are implemented at different physical locations.

Computer-readable media includes both non-transitory computer storage media and communication media including any medium that facilitates transfer of a computer program from one place to another. A non-transitory storage medium may be any available medium that may be accessed by a general-purpose or special-purpose computer. By way of example, and not limitation, non-transitory computer-readable media may include RAM, ROM, electrically erasable programmable ROM (EEPROM), flash memory, compact disk (CD) ROM or other optical disk storage, magnetic disk storage or other magnetic storage devices, or any other non-transitory medium that may be used to carry or store desired program code means in the form of instructions or data structures and that may be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of computer-readable medium. Disk and disc, as used herein, include CD, laser disc, optical disc, digital versatile disc (DVD), floppy disk and Blu-ray disc where disks usually reproduce data magnetically, while discs reproduce data optically with lasers. Combinations of the above are also included within the scope of computer-readable media.

As used herein, including in the claims, "or" as used in a list of items (e.g., a list of items prefaced by a phrase such as "at least one of" or "one or more of") indicates an inclusive list such that, for example, a list of at least one of A, B, or C means A or B or C or AB or AC or BC or ABC (i.e., A and B and C). Also, as used herein, the phrase "based on" shall not be construed as a reference to a closed set of conditions. For example, an example step that is described as "based on condition A" may be based on both a condition A and a condition B without departing from the scope of the present disclosure. In other words, as used herein, the phrase "based on" shall be construed in the same manner as the phrase "based at least in part on."

The term "determine" or "determining" encompasses a wide variety of actions and, therefore, "determining" can include calculating, computing, processing, deriving, investigating, looking up (such as via looking up in a table, a database or another data structure), ascertaining and the like. Also, "determining" can include receiving (such as receiving information), accessing (such as accessing data in a memory) and the like. Also, "determining" can include resolving, selecting, choosing, establishing and other such similar actions.

In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label, or other subsequent reference label.

The description set forth herein, in connection with the appended drawings, describes example configurations and does not represent all the examples that may be implemented or that are within the scope of the claims. The term "example" used herein means "serving as an example, instance, or illustration," and not "preferred" or "advantageous over other examples." The detailed description includes specific details for the purpose of providing an understanding of the described techniques. These techniques, however, may be practiced without these specific details. In some instances, known structures and devices are shown in block diagram form in order to avoid obscuring the concepts of the described examples.

The description herein is provided to enable a person having ordinary skill in the art to make or use the disclosure. Various modifications to the disclosure will be apparent to a person having ordinary skill in the art, and the generic principles defined herein may be applied to other variations without departing from the scope of the disclosure. Thus, the disclosure is not limited to the examples and designs described herein but is to be accorded the broadest scope consistent with the principles and novel features disclosed herein.

What is claimed is:

1. A method for wireless communications at a user equipment (UE), comprising:
   receiving, by the UE, within a threshold number of transmission time intervals, one or more downlink grants while operating in accordance with a first receive state of a plurality of receive states at the UE;
   determining, by the UE, a set of weighting factors for each transmission time interval within the threshold number of transmission time intervals, wherein each weighting factor of the set of weighting factors is based at least in part on a spectral efficiency of channel communications between a network entity and the UE, wherein the spectral efficiency is determined based at least in part on a ratio between a first spectral efficiency associated with scheduled information bits per resource element scheduled by the network entity and a second spectral efficiency associated with a number of information bits per resource element the UE is capable of decoding, and wherein the second spectral efficiency is determined by estimating, at the UE, a capability to decode the number of information bits per resource element;
   summing, by the UE, at least a subset of the set of weighting factors in order to identify a transition determination value; and
   transitioning, by the UE, from the first receive state to a second receive state of the plurality of receive states based at least in part on the transition determination value.

2. The method of claim 1, further comprising:
   determining the first spectral efficiency by summing one or more spectral efficiency values for one or more respective code words of a downlink grant, each of the one or more spectral efficiency values being a product of a number of layers associated with the downlink grant, a code rate, and a modulation order for individual ones of the one or more respective code words.

3. The method of claim 1, further comprising:
   transmitting a channel state information report based at least in part on a mapping between the second spectral efficiency and a rank indication, a channel quality index, or both.

4. The method of claim 1, wherein the summing at least the subset of the set of weighting factors in order to identify the transition determination value further comprises:
   summing individual weighting factors that correspond to individual transmission time intervals of the threshold number of transmission time intervals that have at least one of the one or more downlink grants.

5. The method of claim 4, wherein the transition determination value comprises a burst detection transition determination value based at least in part on summing of at least the subset of the set of weighting factors in accordance with a burst detection function, the method further comprising:
   determining whether to transition from the first receive state to the second receive state based at least in part on the burst detection transition determination value, wherein the first receive state comprises a receive disallowed state and the second receive state comprises a receive standby state.

6. The method of claim 5, further comprising:
   comparing the burst detection transition determination value to a threshold burst detection transition determination value; and
   determining whether to transition from the first receive state to the second receive state based at least in part on the comparing.

7. The method of claim 6, further comprising:
   determining to transition from the first receive state to the second receive state based at least in part on the burst detection transition determination value exceeding the threshold burst detection transition determination value.

8. The method of claim 6, wherein the threshold burst detection transition determination value is configured based at least in part on long-term downlink traffic statistics, short-term downlink traffic statistics, or both.

9. The method of claim 4, wherein the transition determination value comprises a scheduling rate transition determination value based at least in part on summing of at least the subset of the set of weighting factors in accordance with a scheduling rate function, the method further comprising:
   determining whether to transition from the first receive state to the second receive state based at least in part on the scheduling rate transition determination value, wherein the first receive state comprises a receive standby and the second receive state comprises a receive disallowed state.

10. The method of claim 9, further comprising:
    comparing the transition determination value to a threshold scheduling rate transition determination value; and
    determining whether to transition from the first receive state to the second receive state based at least in part on the comparing.

11. The method of claim 10, further comprising:
    determining to transition from the first receive state to the second receive state based at least in part on the scheduling rate transition determination value exceeding the threshold scheduling rate transition determination value.

12. The method of claim 10, wherein the threshold scheduling rate transition determination value is configured based at least in part on long-term downlink traffic statistics, short-term downlink traffic statistics, or both.

13. The method of claim 1, wherein the first receive state is associated with a first number of receive antennas and the second receive state is associated with a second number of receive antennas different than the first number of receive antennas.

14. The method of claim 1, wherein each weighting factor of the set of weighting factors is based at least in part on a function of a subframe index of the one or more downlink grants.

15. The method of claim 1, wherein the one or more downlink grants comprise one-layer grants, two-layer grants, or a combination thereof.

16. An apparatus for wireless communications at a user equipment (UE), comprising:
at least one processor; and
at least one memory coupled with the at least one processor and storing instructions that are executable by the at least one processor to cause the apparatus to:
receive, within a threshold number of transmission time intervals, one or more downlink grants while operating in accordance with a first receive state of a plurality of receive states at the UE;
determine a set of weighting factors for each transmission time interval within the threshold number of transmission time intervals, wherein each weighting factor of the set of weighting factors is based at least in part on a spectral efficiency of channel communications between a network entity and the UE, wherein the spectral efficiency is based at least in part on a ratio between a first spectral efficiency associated with scheduled information bits per resource element scheduled by the network entity and a second spectral efficiency associated with a number of information bits per resource element the UE is capable of decoding, and wherein the second spectral efficiency is based at least in part on an estimate of a capability to decode the number of information bits per resource element;
sum at least a subset of the set of weighting factors in order to identify a transition determination value; and
transition from the first receive state to a second receive state of the plurality of receive states based at least in part on the transition determination value.

17. The apparatus of claim 16, wherein the instructions are further executable by the at least one processor to cause the apparatus to:
determine the first spectral efficiency by summing one or more spectral efficiency values for one or more respective code words of a downlink grant, each of the one or more spectral efficiency values being a product of a number of layers associated with the downlink grant, a code rate, and a modulation order for individual ones of the one or more respective code words.

18. The apparatus of claim 16, wherein the instructions to sum at least the subset of the set of weighting factors in order to identify the transition determination value are further executable by the at least one processor to cause the apparatus to:
sum individual weighting factors that correspond to individual transmission time intervals of the threshold number of transmission time intervals that have at least one of the one or more downlink grants.

19. The apparatus of claim 18, wherein the transition determination value comprises a burst detection transition determination value based at least in part on summing of at least the subset of the set of weighting factors in accordance with a burst detection function, and the instructions are further executable by the at least one processor to cause the apparatus to:
determine whether to transition from the first receive state to the second receive state based at least in part on the burst detection transition determination value, wherein the first receive state comprises a receive disallowed state and the second receive state comprises a receive standby state.

20. The apparatus of claim 19, wherein the instructions are further executable by the at least one processor to cause the apparatus to:
compare the burst detection transition determination value to a threshold burst detection transition determination value; and
determine whether to transition from the first receive state to the second receive state based at least in part on the comparing.

21. The apparatus of claim 20, wherein the instructions are further executable by the at least one processor to cause the apparatus to:
determine to transition from the first receive state to the second receive state based at least in part on the burst detection transition determination value exceeding the threshold burst detection transition determination value.

22. The apparatus of claim 18, wherein the transition determination value comprises a scheduling rate transition determination value based at least in part on summing of at least the subset of the set of weighting factors in accordance with a scheduling rate function, and the instructions are further executable by the at least one processor to cause the apparatus to:
determine whether to transition from the first receive state to the second receive state based at least in part on the scheduling rate transition determination value, wherein the first receive state comprises a receive standby and the second receive state comprises a receive disallowed state.

23. The apparatus of claim 22, wherein the instructions are further executable by the at least one processor to cause the apparatus to:
compare the transition determination value to a threshold scheduling rate transition determination value; and
determine whether to transition from the first receive state to the second receive state based at least in part on the comparing.

24. The apparatus of claim 23, wherein the instructions are further executable by the at least one processor to cause the apparatus to:
determine to transition from the first receive state to the second receive state based at least in part on the scheduling rate transition determination value exceeding the threshold scheduling rate transition determination value.

25. An apparatus for wireless communications at a user equipment (UE), comprising:
means for receiving, within a threshold number of transmission time intervals, one or more downlink grants while operating in accordance with a first receive state of a plurality of receive states at the UE;
means for determining a set of weighting factors for each transmission time interval within the threshold number of transmission time intervals, wherein each weighting factor of the set of weighting factors is based at least in part on a spectral efficiency of channel communications between a network entity and the UE, wherein the spectral efficiency is based at least in part on a ratio between a first spectral efficiency associated with scheduled information bits per resource element scheduled by the network entity and a second spectral efficiency associated with a number of information bits per resource element the UE is capable of decoding, and wherein the second spectral efficiency is based at least in part on an estimate of a capability to decode the number of information bits per resource element;

means for summing at least a subset of the set of weighting factors in order to identify a transition determination value; and means for transitioning from the first receive state to a second receive state of the plurality of receive states based at least in part on the transition determination value.

26. A non-transitory computer-readable medium storing code for wireless communications at a user equipment (UE), the code comprising instructions when executed by a processor to cause the UE to:

receive, within a threshold number of transmission time intervals, one or more downlink grants while operating in accordance with a first receive state of a plurality of receive states at the UE;

determine a set of weighting factors for each transmission time interval within the threshold number of transmission time intervals, wherein each weighting factor of the set of weighting factors is based at least in part on a spectral efficiency of channel communications between a network entity and the UE, wherein the spectral efficiency is based at least in part on a ratio between a first spectral efficiency associated with scheduled information bits per resource element scheduled by the network entity and a second spectral efficiency associated with a number of information bits per resource element the UE is capable of decoding, and wherein the second spectral efficiency is based at least in part on an estimate of a capability to decode the number of information bits per resource element;

sum at least a subset of the set of weighting factors in order to identify a transition determination value; and transition from the first receive state to a second receive state of the plurality of receive states based at least in part on the transition determination value.

* * * * *